US012304796B2

(12) United States Patent
Wilson

(10) Patent No.: US 12,304,796 B2
(45) Date of Patent: May 20, 2025

(54) PORTABLE WATER DISPENSING STATION

(71) Applicant: Civiq Pty Ltd, Silverwater (AU)

(72) Inventor: Adrian Wilson, Denistone (AU)

(73) Assignee: Civiq Pty Ltd, Denistone (AU)

(*) Notice: Subject to any disclaimer, the term of this patent is extended or adjusted under 35 U.S.C. 154(b) by 43 days.

(21) Appl. No.: 17/276,799

(22) PCT Filed: Sep. 20, 2019

(86) PCT No.: PCT/AU2019/051011
§ 371 (c)(1),
(2) Date: Mar. 16, 2021

(87) PCT Pub. No.: WO2020/056466
PCT Pub. Date: Mar. 26, 2020

(65) Prior Publication Data

US 2025/0019220 A1 Jan. 16, 2025

(30) Foreign Application Priority Data

Sep. 20, 2018 (AU) .................................. 201803535

(51) Int. Cl.
*B67D 1/00* (2006.01)
*B67D 1/16* (2006.01)

(52) U.S. Cl.
CPC ............. *B67D 1/0014* (2013.01); *B67D 1/16* (2013.01); *B67D 2210/00031* (2013.01); *B67D 2210/00133* (2013.01)

(58) Field of Classification Search
CPC .................... B67D 1/0014; B67D 1/16; B67D 2210/00031; B67D 2210/00133
See application file for complete search history.

(56) References Cited

U.S. PATENT DOCUMENTS

| | | | | |
|---|---|---|---|---|
| 9,708,113 B1 * | 7/2017 | Seibold | .................. | B65D 85/72 |
| 9,890,026 B1 * | 2/2018 | Bohamed | ............. | B67D 1/0082 |
| 2009/0043171 A1 * | 2/2009 | Rule | ...................... | A61B 5/153 600/300 |

(Continued)

FOREIGN PATENT DOCUMENTS

| | | | | |
|---|---|---|---|---|
| CN | 103803751 A * | 5/2014 | | |
| DE | 102016014357 A1 * | 6/2018 | | |
| WO | WO-2018066801 A1 * | 4/2018 | ............. | B01D 35/02 |

*Primary Examiner* — Bob Zadeh

(74) *Attorney, Agent, or Firm* — Shewchuk IP Services, LLC; Jeffrey D. Shewchuk

(57) ABSTRACT

A portable water dispensing station includes: a housing; internal water supply pipework plumbed to supply water from an externally accessible water inlet coupling at the housing to one or more water dispensing outlets arranged at different points about the housing; two coaxially spaced apart transport wheels mounted near a bottom face of the housing to protrude from the bottom face such that the unit can be wheeled towards/away from a stand surface on which the unit is to be deployed in use; and a base for supporting the housing on the stand surface, with at least two base flaps permanently hinged on opposite sides of the housing for deployment between a stored position in which the base flaps extend about parallel to the respective housing sides and a self-arrestable fully deployed position extending substantially perpendicular to the respective housing sides and abutting on the stand surface.

21 Claims, 12 Drawing Sheets

(56) References Cited

U.S. PATENT DOCUMENTS

| | | | | |
|---|---|---|---|---|
| 2014/0202551 | A1* | 7/2014 | Hahn | F16K 51/00 137/15.01 |
| 2014/0209634 | A1* | 7/2014 | Metropulos | B67D 1/0041 222/608 |
| 2015/0101119 | A1* | 4/2015 | Robinson | E03B 9/20 4/596 |
| 2018/0134540 | A1* | 5/2018 | Garcia | C02F 1/4618 |

* cited by examiner

Detail A 90
94
75
85
90
71
71
95
83
30
86
84
80
82
74
26
82
80
23
22
124
120
20
76
122
124
76
68
78
78
72
71
70
72
69
24
28

Base Flaps in Stored/Retracted Position
91
90
12
F
F
92
28
30
131
130
130
149
152
152
148
141
150
140
142
76
133
82
78
132
134
146
83
74
147
24
75
154
144
154
158
156
159

One Base Flap
in
Deployed Position
but
not Arrested / Locked

One Base Flap in Transition between Deployed & Stored Positions
F
F
90
Stored
Deployed
152
149
140
146
150
130
132
154
74

PORTABLE WATER DISPENSING STATION

TECHNICAL FIELD

The present innovation relates to the provision of drinking water in public places.

INCORPORATION BY REFERENCE

The present application claims priority from Australian patent application 2018903535 the specification of which is herein incorporated by way of short-hand cross-reference.

BACKGROUND

For decades, fixed pedestal drinking fountains have been provided in parks and other public areas for use by the public. These often comprise sculpted metal pedestals with suitable internal pipe work and exterior water dispensing spouts or nozzles ('bubblers') and/or taps. The pedestals generally incorporate various types of footing structures to permanently secure/fix the water dispensing station to a cast concrete or other base. A mains water supply line is connected/plumbed to the water fountain's internal pipework, and either push-button actuated valves or cocks control water flow from the dispensing spout.

In more recent years, drinking fountains have morphed to enable hassle-free filling of water bottles by including, in addition to a bubbler facility, unobstructed accessible dispending taps on the side(s) of the pedestal. In more sophisticated designs, dedicated recessed fill stands are incorporated into columnar water dispensing units, to allow bottles to be set-down while being refilled.

Furthermore, to deal with public perceptions about water supply safety, taste and smell (especially chloramines), modern water dispensing units (herein also interchangeably termed 'stations') often incorporate filtration equipment. Australian Innovation Patent no. 200810137 illustrates an example of such unit.

Equally, in order to deal with accidental or malicious water spillage, which can lead to hazardous water pooling at the base of the pedestal, it is known to incorporate water catchment structures at the pedestal footing which are themselves connected to drain pipes and the like. The above mentioned Australian innovation patent also illustrates such a facility.

Portable drinking water dispensing stations are also known, and designs vary greatly. Some are custom-made and incorporated into a trailer that can be towed by a prime mover (truck or car) to a location where it is to be used. Typically, such stations comprise multiple dispensing nozzles/taps and are thus typically bulky and heavy. Some units comprise an internal water storage tank of substantial capacity to supply multiple water dispensing outlets; the tank can be filled from mains water through a suitable coupling.

Other portable water dispensing stations are adapted from traditional drinking pedestals with single or double drinking/bottle filling spouts. The pedestal base of such units is not permanently fixed to the ground but instead modified into a stand platform having a substantial footprint area. The stand platform is devised to keep the pedestal upright and prevent sideways tipping-over under side loads. In some cases, the stand platform is demountable from the upright pedestal unit, to facilitate transport. In other cases, while also being demountable, the metallic stand platform is replaced with a hollow, blow-(or otherwise) moulded, prismatic base that in use is filled with water to provide a heavy counterweight to stabilise the upright dispensing unit when mounted/secured to the base. In any event, this type of portable water dispensing units require some type of transport equipment to move them around to a deployment location.

Patent publication US 2015/0101119 A1 describes a portable water dispensing unit of the above-mentioned type. It comprises a rectangular cross-section light metal frame element providing top, lateral and bottom sides of the unit. The frame is devised to receive and secure front and rear panels that may display advertising or signage, and house plumbing. The stand illustrated in the US document appears to be a simple metallic footing frame. In contrast, what appears to be an Australian product (MeetPat MP-P-02) based on this patent document, uses a water-fillable ballast stand as note above. In both cases, the stand is demountable from the portable water filling unit proper, which is sized and dimensioned to pack into a carry bag after the stand has been removed, for transport and storage purposes. According to technical specifications, the unit has a weight of approx. 20 kg.

The present invention was conceived with an aim of providing a portable water-dispensing station with improved versatility of deployment.

In particular, it would prove advantageous to make available a portable water dispensing station, either being one or both of a bubbler-or fountain-type water dispenser and a water bottle filling station, which can be deployed without the need for time consuming assembly operations at the place of deployment.

It would be particularly useful to provide such portable water-dispensing unit with an on-board transport arrangement that facilitates moving the unit.

Stability of such unit against tipping-over, once deployed on location, without the need for arresting anchors and similar fasteners, would provide an added bonus.

SUMMARY OF THE INVENTION

According to the present invention there is provided a portable water dispensing station, including: a housing; internal water supply pipework plumbed to supply water from an externally accessible water inlet coupling at the housing to at least one, but preferably multiple water dispensing outlets arranged at different points about the housing; at least two coaxially spaced apart transport wheels mounted near a bottom face of the housing to protrude from the bottom face such that the station can be wheeled towards/away from a stand surface on which the unit is to be deployed in use; and a base for supporting the housing on the stand surface, the base comprising at least two base flaps permanently hinged about a respective hinge axis to opposite sides of the housing for deployment between a fixable stored position in which the base flaps extend about parallel to the respective housing sides and a fixable fully deployed position in which the base flaps extend substantially perpendicular to the respective housing sides and abut the stand surface.

Advantageously, the station will furthermore comprise internal water drainage pipework plumbed to drain water spilled from the water dispensing outlet(s) into associated drainage inlets towards an externally accessible water drainage coupling of the unit.

In one embodiment, the station's housing has a roughly box-shape appearance, with rectangular cross-section, wherein preferably the width is typically two to four times a depth of the unit, and the height three to five or more times the width, thus defining a rectangular columnar body having a greater propensity to be tipped-over by loads applied on the wider front and rear side faces than loads applied perpendicular to the narrower side faces of the housing. The two foldable base flaps, hinged near or at the bottom of the front and rear sides (faces), can be deployed individually, therefore provide in their deployed state extra stability when the water dispensing station is in use. Further, the permanent, hinged mounting of the flaps to the station's housing dispenses with a need to remove these for transport and storage when not in use. No separate mounting/assembly operation is therefore required.

Advantageously, at least one but preferably both of the base flaps is/are shaped and/or hinged near the bottom of the housing in such manner that when being moved into and reaching the fully deployed position, the wheels are lifted in the process by a predetermined small distance from the stand surface. This increases stability and counters against sliding of the unit with its deployed base legs.

The base flaps preferably have a width similar to the width of the housing (thus increasing inertia moments once deployed to stabilise the unit) and may comprise a rectangular plate secured between or integral with two mounting profiles which in turn are pivotally secured, eg by axles, to respective opposite width-ward sides of the housing. The plates may have a suitably patterned or shaped surface on the face which in deployed state of the base flap abuts the stand surface. This increases frictional engagement between base flaps and stand surface when the former are deployed.

Preferably, the mounting profiles are L-sections having a longer leg portion secured to or integral with the plate and a shorter leg portion extending away from the plate, wherein a mounting (eg hole) for securing the base flaps to a frame member at the respective front and rear housing sides is provided at a location on the shorter leg that enables the base flaps to rotate about the hinge axis and cantilever the housing in an upward direction and lift the wheels from the stand surface during the last phase of movement of the base flaps into the fully deployed position where the base flap plate is co-planar with the stand surface.

Advantageously, the station further includes for each base flap at least one self-engaging arresting mechanism devised to lock and positionally fix the base flaps as each flap is rotated towards and upon reaching its fully deployed position. This dispenses with a need for separate manual handling of locking members, such as locking pins, to secure the deployed position of the base flaps, which in particular also serve to prevent the flaps from being folded back onto the housing when under lever loads.

Such arresting mechanism could be present at both of the width-ward sides of the housing, ie so that the base flaps are arrested at each of their sides, but this is not essential, and will ultimately depend on the load carrying requirements to prevent the housing from toppling.

In a first embodiment, the arresting mechanism comprises a pivotable locking latch member movable with, and preferably articulated to, the base flap, the locking latch member positioned to self-engage with a retainer at the housing when the base flap reaches or is in its fully deployed position.

Advantageously, a biasing arrangement can be provided to positively bias the locking latch member to remain in its deployed, flap-movement arresting position. The biasing arrangement can comprise a torsion spring element acting on the locking latch member, a (variable) pressure gas spring, gas filled cylinder-piston actuator, or the like.

The arresting mechanism of the first embodiment can furthermore advantageously be configured for manual release. In a preferred form, manual release will be effected by actuating the locking latch member itself. Therefore, the locking latch member may comprise a lever portion positioned such that it is easily accessible from a side of the housing so as to be manually moved (pivoted) thereby releasing the engagement between locking latch member and retainer. Where a biasing arrangement as mentioned above is present, the lever will be dimensioned such that lever action is sufficient to impart a release moment sufficient to overcome the biasing force exerted by the biasing arrangement onto the locking latch member, and move the locking latch member out of engagement with the retainer.

Preferably, in the arresting mechanism of the first embodiment, one of the L-sections of each base flap will carry the locking latch member, in this case articulated/pivoted near a terminal end of the shorter leg; the locking latch member will also be called toggle strap herein below, given a preferred embodiment configuration thereof.

The toggle strap can advantageously include a sideways protruding guiding pin which is received within a curved slot at the housing, thereby promoting guidance of the locking latch member during rotation of the base flap between its stored and deployed positions, also thereby ensuring that the locking latch member is correctly orientated and directed to self-engage with its cooperating retainer at the housing. The retainer may be provided by an edge of a through hole in a housing side wall/panel through which the lever portion extends.

In a second embodiment, the arresting mechanism comprises at least one locking cam arranged to rotate with a respective one of the base flaps about the hinge axis, and at least one locking latch member cooperating with the locking cam, the latch member secured to the housing for to and fro or rotational movement such that a terminal end of the latch member, or otherwise suitable follower at the latch member, eg a roller, is disposed to ride a guide surface of the locking cam in crank-like manner during rotation of the hinged base flap between its stored and fully deployed position. The guide surface will have a step or depression into which the terminal end locates in pawl-like manner when the base flap is in its fully deployed position. This arrangement could be loosely defined as a variation of a ratchet and pawl mechanism whereby rotation of the base flap into its fully deployed position causes the terminal end of the latch member to move into the step, whereby rotation in the opposite direction towards the retracted position is inhibited by the step, thereby effectively locking the base flap in its deployed state.

Advantageously, as with the first embodiment of the arresting mechanism, a biasing arrangement can be provided to positively bias the terminal end (or follower) of the locking latch member onto the locking cam's guide surface, thereby ensuring the locking latch member will remain engaged to the cam (but in removable manner) and in particular maintain its engagement when in the (locking) step at the cam. The biasing arrangement can comprise a torsion spring element acting on the locking latch, a (variable) pressure gas spring acting on an end of the latch member opposite its can-engaging end, a gas filled cylinder-piston actuator, or the like.

The guide surface of/at the cam may furthermore be contoured in such manner that it includes a small protrusion (hump) over which the terminal end (or follower) of the latch member will ride immediately before the base flap reaches its stored position when the base flap is rotated from the deployed into the stored position. This hump, together with the biasing arrangement, assists in maintaining the base flap in its stored position, without a separate mechanism to lock this position.

The arresting mechanism of the second embodiment can furthermore also be configured to be manually releasable. In a preferred form, such release mechanism will include a release lever pivoted at the housing and articulated to the locking latch member in such manner that it can selectively move the terminal end (or follower) of the latch member out of engagement with the step at the cam. Where a biasing arrangement as mentioned above is present, the release lever will be dimensioned such that its lever action is sufficient to impart a release moment sufficient to overcome the biasing force exerted by the biasing arrangement onto the locking latch member, and move the locking latch out of engagement with the step.

In a preferred form, the shorter arm portions of one or both of the (L-) mounting profiles of the base plates is shaped to integrally define the locking cam at one or both with-ward ends of the base flaps, and there will accordingly be one or two locking strap members with associated biasing arrangements to secure the deployed state of the base flaps.

Advantageously, one of the base flaps will be articulated (ie hinged) to the housing about a same axis of rotation as that common to the pair of support wheels. Preferably, a common axle will be provided for one of the wheels and one of the L-shaped mounting profiles of the base flap.

The axis of rotation will be located as near as possible to a front or back side lower edge of the housing such that the housing may be tipped over in controlled manner when the base flaps are in their stored position in which these extend substantially parallel to the front and back faces of the housing. In this manner, the unit can be moved like a two-wheeled transport trolley from/to its deployment location. Furthermore, this preferred arrangement enables the unit to be tilted about the lower front (or rear) edge, more precisely about the axis of rotation of the unit's pair of wheels, with only the base flap sharing this axis of rotation having been unlocked and pivoted into its storage/transport position. The other base flap may remain in its fully deployed position. In that way, the still deployed base flap may serve as a temporary surface for transporting boxes and other equipment together with the unit.

In one embodiment, lifting of the unit's pair of transport wheels as consequence of in particular its axis-sharing base flap being rotated into its fully deployed position is achieved in that the distance of a lowermost ground-engaging surface of the base flap plate or L-mounting profiles to the axis of rotation being between a few millimetres to a few centimetres larger than the diameter of the transport wheels (or castors) secured to the housing bottom.

Given that the relevant base flap pivots off the same axis of rotation (or shaft) used by the wheels, it is preferred that the base flap exhibits a somewhat rounded profile at the ground-engaging side closest to the axis of rotation, to facilitate full rotation of the base flap into its fully deployed position after that rear part first engages with the ground during the flap's pivoting movement and subsequently lifts the wheels of the ground.

Advantageously, at least one of the water dispensing outlets is devised as a container filling outlet located above a support surface at the housing adapted to support a drinking container in upright standing position.

In a preferred embodiment, the unit will have two said bottle (container) filling outlets on opposite front and rear sides of the housing, in recesses within the housing or enclosed within a shroud, so as to hinder direct contact with the container filling outlet. Each such container filling outlet will be associated with a drainage inlet (covered by a grate or suitably tight-meshed strainer) at the container support surface connected to the water drainage pipework.

In another preferred embodiment, the unit will further or additionally comprise a bubbler-or fountain-type water dispensing outlet.

Advantageously, the fountain-type water dispenser will be incorporated/be present at a tray which is articulated to a side of the housing in such manner that it is deployable between an arrestable folded position about flush with the front or rear side of the housing and an arrested but releasable deployed position in which the tray extends about perpendicular from the housing side.

The tray will advantageously be located at a height suitable for access by people in wheel chairs and/or children. The tray will advantageously have a top surface which may be concave towards a drainage channel or drain hole which in turn is in communication with the internal drainage pipework. Incorporation of a folding drinking fountain tray makes the unit more compact and easier to transport and store while not in use.

Preferably, each water dispensing outlet is arranged to be actuated by way of a respective actuator, wherein each actuator is disposed at a location on the unit which is in vicinity of its respective outlet. The skilled person is cognisant of the various ways this can be accomplished, eg push-button shutter valves, twist-handled shutter valves, turn-knob shutter valves, etc.

The skilled person will appreciate that there are multiple ways in which the water supply pipework as well as the drainage pipework of the station may be embodied, with appropriate hydraulic equipment components known in the art, such as mains water pressure reducers, flow-switching and/or shut-off valves, couplings to connect the station to a mains water supply and to a drainage facility, rigid and flexible water pipes, etc.

The skilled person will also appreciate that there are various types of suitable water inlet and outlet couplings that can be employed in the station. These couplings will preferably be provided on opposite width-ward sides of the housing, so that water supply and drainage pipework can be connected to the station, whereby this will allow operators to connect multiple such stations in series where deployment of multiple units is required in the circumstances.

In order to further increase stability of the unit (station) when deployed, a water ballast tank may be received within the housing. Preferably, the ballast tank will be positioned at a lower end of the housing near its bottom, to lower the centre of gravity of the station, once the tank is filled, and increase stability against being tipped-over.

The ballast tank can have a dedicated filling/drainage spout(s) with shut-off valve(s) for filling and draining the tank independently of the unit's internal water supply and drainage pipework.

In one embodiment, the ballast tank may have a valved water inlet plumbed to the internal water supply pipework which receives mains water, so that it can be filled prior to the unit being readied for use via the single water inlet coupling.

In a more preferred embodiment, however, the ballast tank will have a tank water supply line/pipe plumbed to the internal water drainage pipework so that it can be filled using water supplied from the water dispensing outlet(s) via the associated drainage inlet(s).

In both cases, a separate, dedicated tank drainage arrangement could be provided.

However, a more preferred embodiment will be one in which the water ballast tank is fully incorporated hydraulically into the internal water drainage pipework. That is, one can dispense with a separate valved tank filling arrangement, and instead spill water drainage from the unit is always accomplished via directing it first into and then from the ballast tank to waste. To this end, it is necessary to have a tank overflow prevention mechanism, which in its simplest form can be a weir from where spill water above a certain fill-degree of the tank can be removed. In one embodiment, this can be achieved by draining tank water into a tank-internal riser pipe plumbed to the housing's water drainage coupling to which a drainage hose can be connected to drain spillage water to a location remotely from the unit, and thus prevent abovementioned slip hazards at the unit.

The water in the ballast tank will add considerable mass to the unit which will increase stability but restrict the movability of the unit. The need to drain the ballast tank after the unit is no longer in use is paramount to being too able to move the unit with ease. Consequently, to facilitate drainage of tank embodiments, which are provided with a raiser tube as fill-control, a cam-valved drainage access may be present near or at the lowest fill level of the tank in the raiser tube. This provides a quick way for the operator to drain the water storage container via the unit's water drainage coupling. A 180 degree turn of the cam will activate the cam and drain the storage container to waste, without having to move or disassemble the unit.

Preferred unit embodiments will incorporate water filtering arrangements/facilities within the housing, accessible through a removable housing panel(s) as is known in the art.

Advantageously also, the housing of the station can be devised with means to secure interchangeable information or signage panels. These panels could even be made integral part of the normal housing panels that encase the internal frame work.

If desired, a solar light module can be provided, to enable temporary illumination of the station overall or at least the water dispensing spouts.

In similar vein, although such equipment increases transport weight of the station, water cooling equipment may be incorporated into the housing, powered either through a suitable connection to external mains power, or by an on-board battery which may be of rechargeable capacitive type.

An illustrative implementation of the present innovation will be described in the following with reference to the accompanying drawings by way of a number of non-limiting embodiments.

DETAILED DESCRIPTION OF PREFERRED EMBODIMENTS

It is to be understood that the invention is described herein below with reference to particular embodiments of the invention, but that there exist alternative implementations of the present invention. The implementations described are intended to be illustrative of the invention, and not limitative. Equally, the illustrations have been simplified by not showing (omitting) representation of the portable water dispensing unit's internal water supply plumbing and water spillage drainage plumbing, as these, whilst present in a working water dispensing unit, are not relevant in the context of the improvements described and claimed herein.

Finally, where relative terms such as upper, lower, front, rear, lateral etc are used, these are intended to provide reference points for locating components of the station 10 illustrated.

Figure 1:
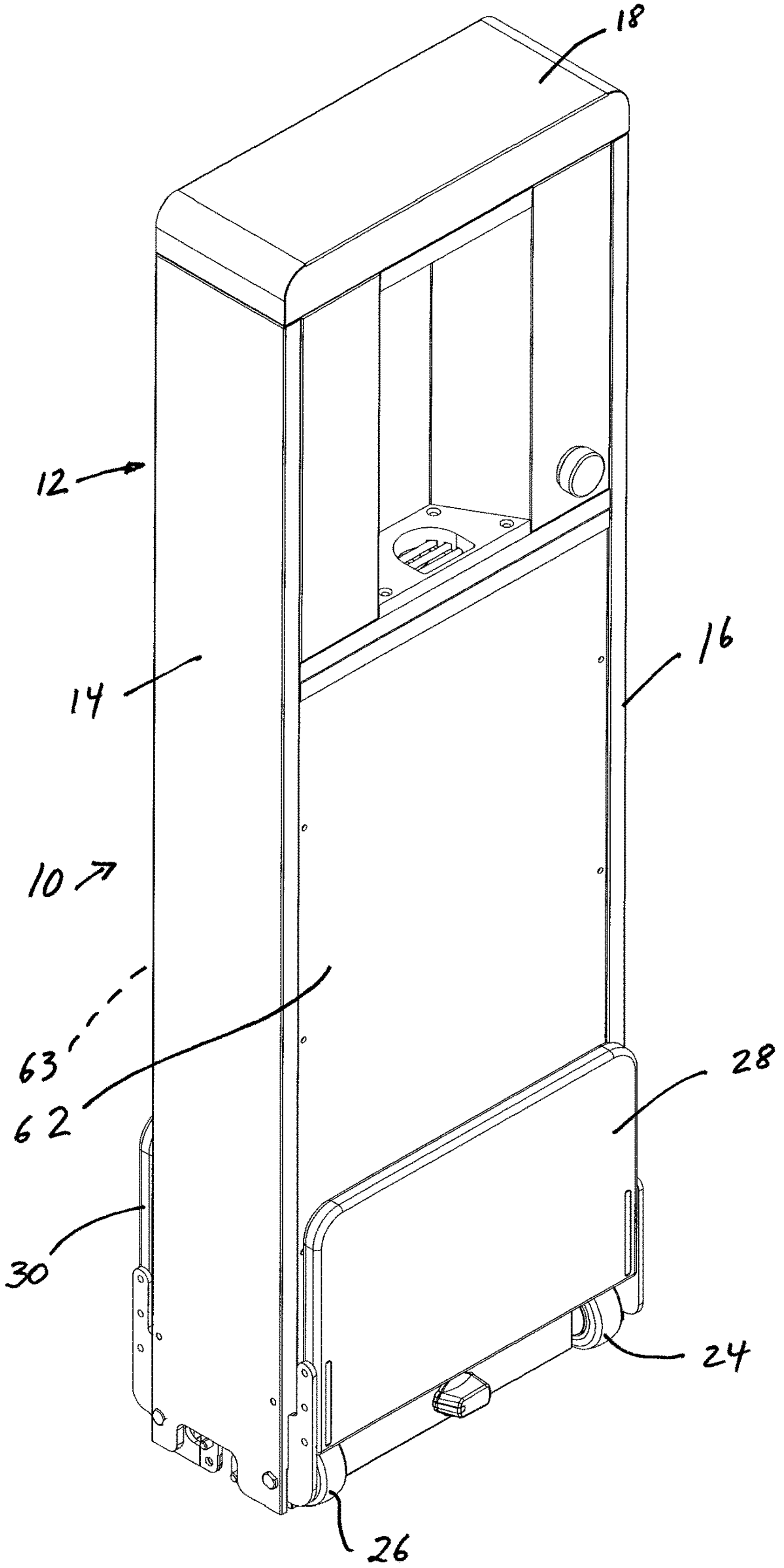
FIG. 1 is a perspective view of a mobile (and modular) water dispensing station according to a first embodiment of the invention, with deployable base (or stability) flaps in a transport configuration.

Referring first to FIGS. 1 and 2, portable water dispensing station 10 comprises a housing 12, front and rear water bottle refill-stations 40 and 50, internal water supply and drainage pipework associated with the refill stations but which for better illustration of the aspects relevant to the present invention have been omitted from the figures, deployable front and rear base (or stand) flaps 28, 30, and transport wheels 24, 26.

But for the incorporation of a drinking fountain 32, as will be described below in more detail, the embodiments of FIGS. 1 and 2*a* /2*b* are the same.

Figure 7:
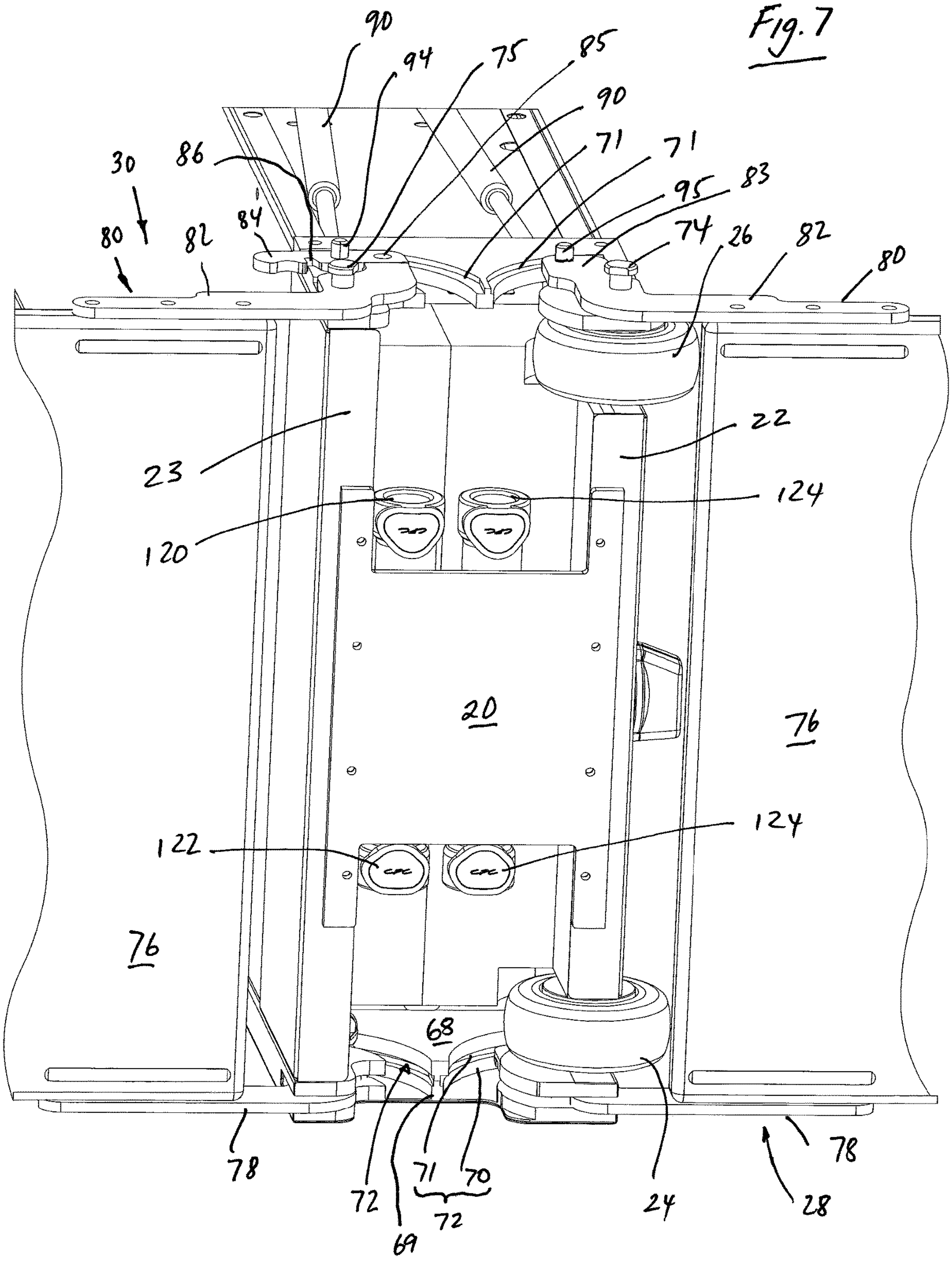
FIG. 7 is a perspective, partial view from the bottom of the station of FIG. 1 or FIGS. 2*a* /2*b*, illustrating further details of the transport wheels and deployed base flaps arrangement.

Referring first to housing 12, it is assembled from lightweight steel sections which provide a roughly box-shaped framework onto which thin steel sheet panels are fastened externally to provide lateral side panels 14, 16, a top cap 18 and a bottom panel 20 (see FIG. 7). On the front and rear, housing 12 has bottom panels 60, 61 extending across the width of the framework, whereas in the embodiment of FIG. 1 one can discern front middle panel 62 (an identical rear middle panel is not visible), whereas in the embodiment of FIGS. 2*a* /2*b* only rear middle panel 63 is visible, as the front lower middle panel has been removed to illustrate the presence of a tank housing box 64 secured within housing 12 above the lower front and rear panels 60, 61 in both station embodiments. Front middle panel normally closes the region of housing 12 in which housing box 64 is received.

Front and rear panels 62/63 can be used to display signage or may be provided with additional fasteners to secure separate display panels with such signage and information materials.

As will be noted, housing 12 has a rectangular cross-section, wherein preferably the width is typically two to four times a depth of the unit, and the height three to five or more times the width. Typical dimensions might be width of 350 mm to 600 mm, depth 100 mm to 300 mm and height up to 1500 mm.

Housing 12 thus defines a rectangular columnar body having a greater propensity to be tipped-over by loads applied on the front and rear side faces than loads applied perpendicular to the narrower lateral side faces of the housing 12.

To counter against tipping moments, and for supporting housing 12 on a stand surface (ground) where portable water dispensing station 10 is to be deployed temporarily, a pair of base flaps 28 and 30 are permanently mounted to the lower end at the front and the rear faces of the housing's framework in an articulated (ie hinged) manner, as explained in more detail below.

Figure 9A:
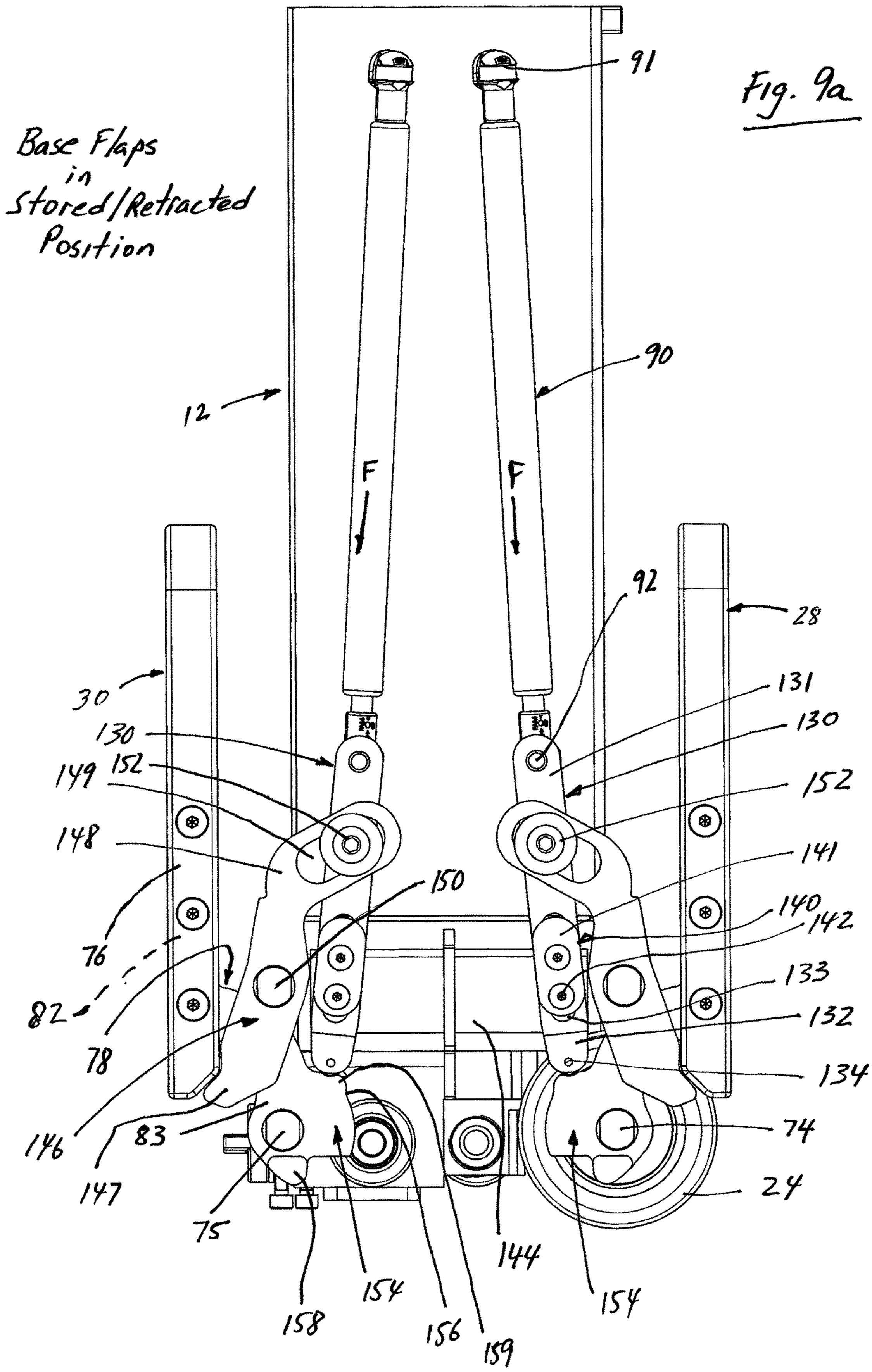
FIGS. 9*a* to 9*d* are a sequence of partial side elevation views of the lower end of the station of FIG. 1 with its side panel removed and the base flaps in different states of deployment, for the purpose of illustrating in detail components of a second embodiment of the locking arrangement (arresting mechanism) for locking the station housing's base flaps in their fully deployed state.
Figure 9B:
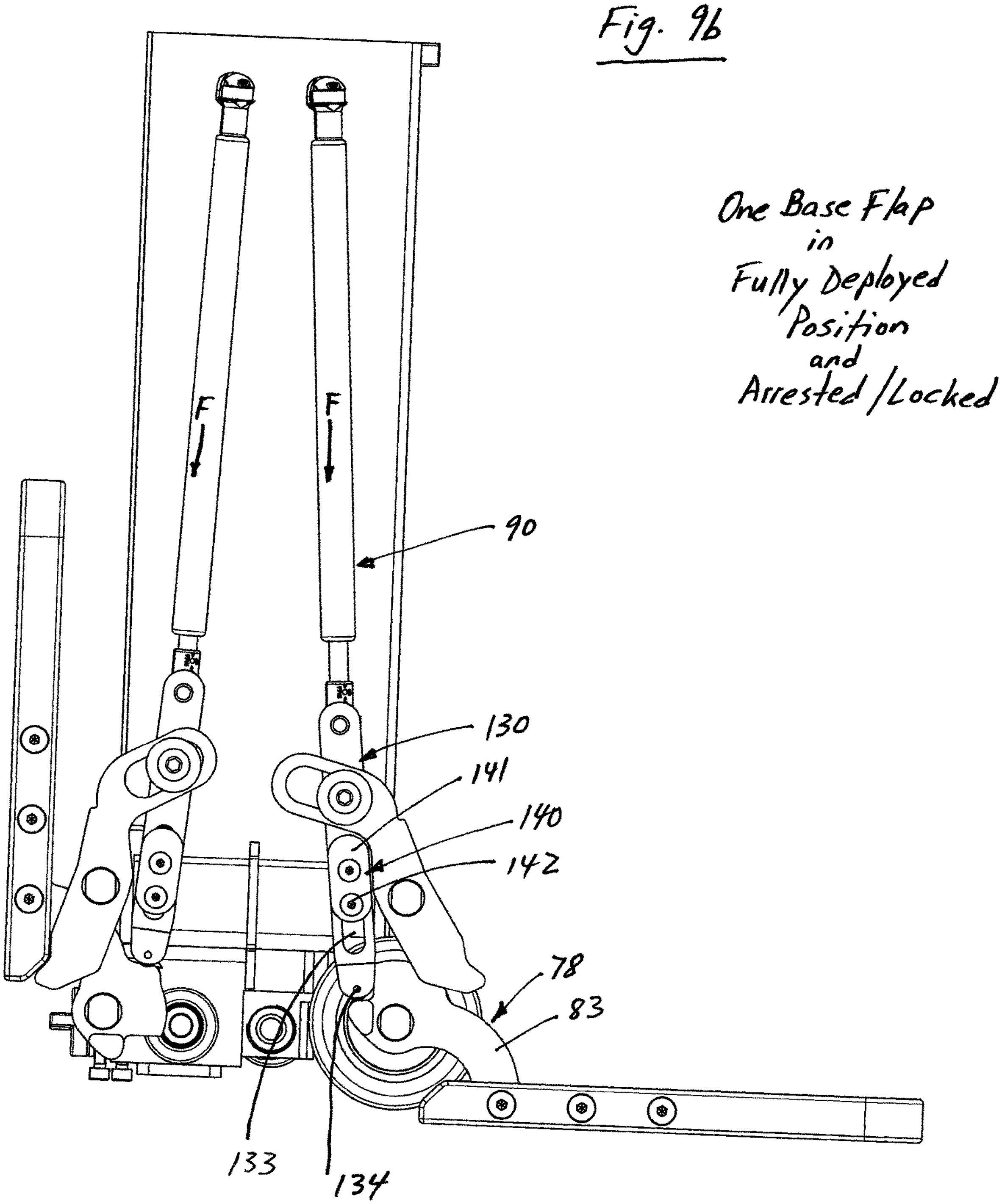
Figure 9C:
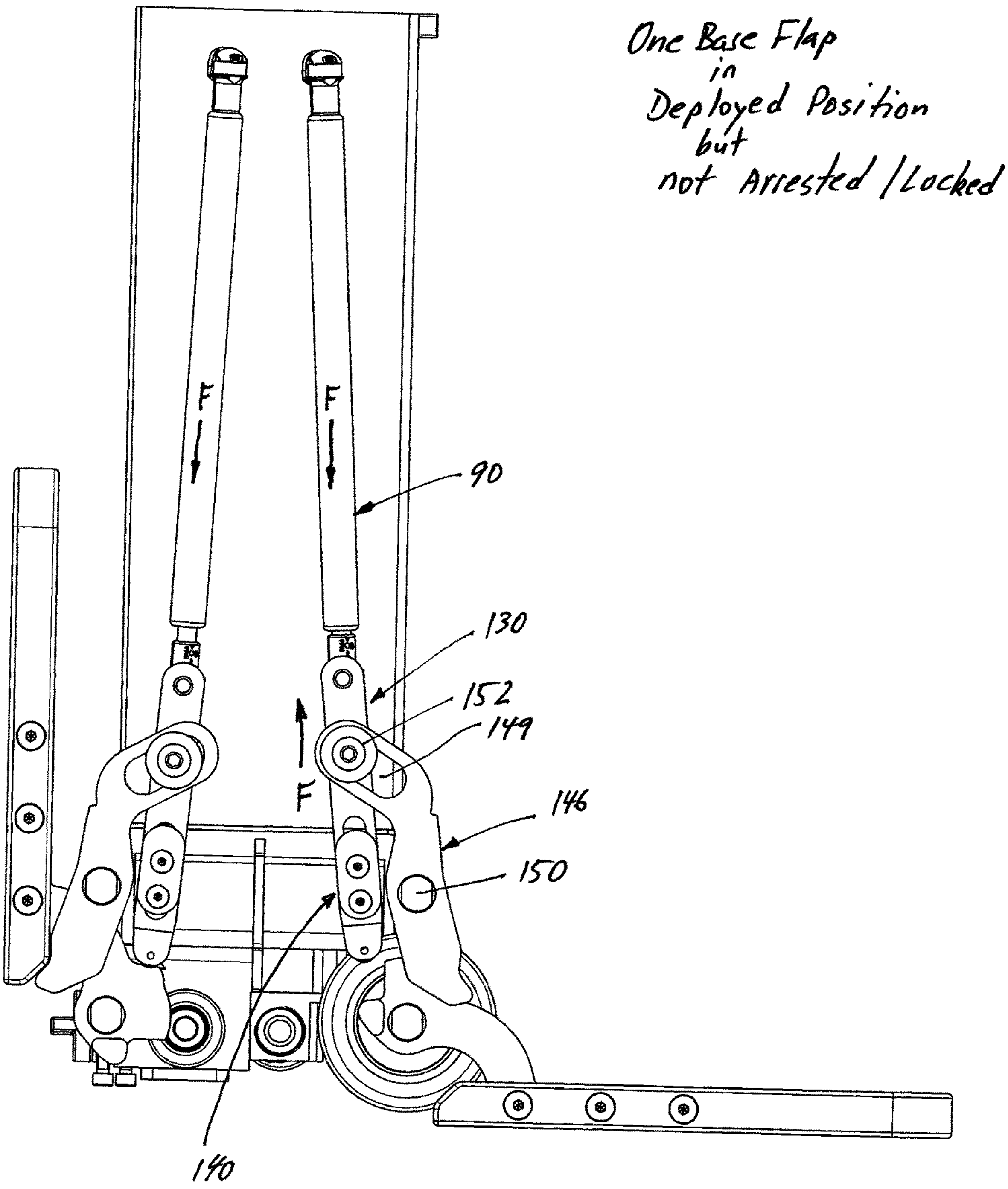
Figure 9D:
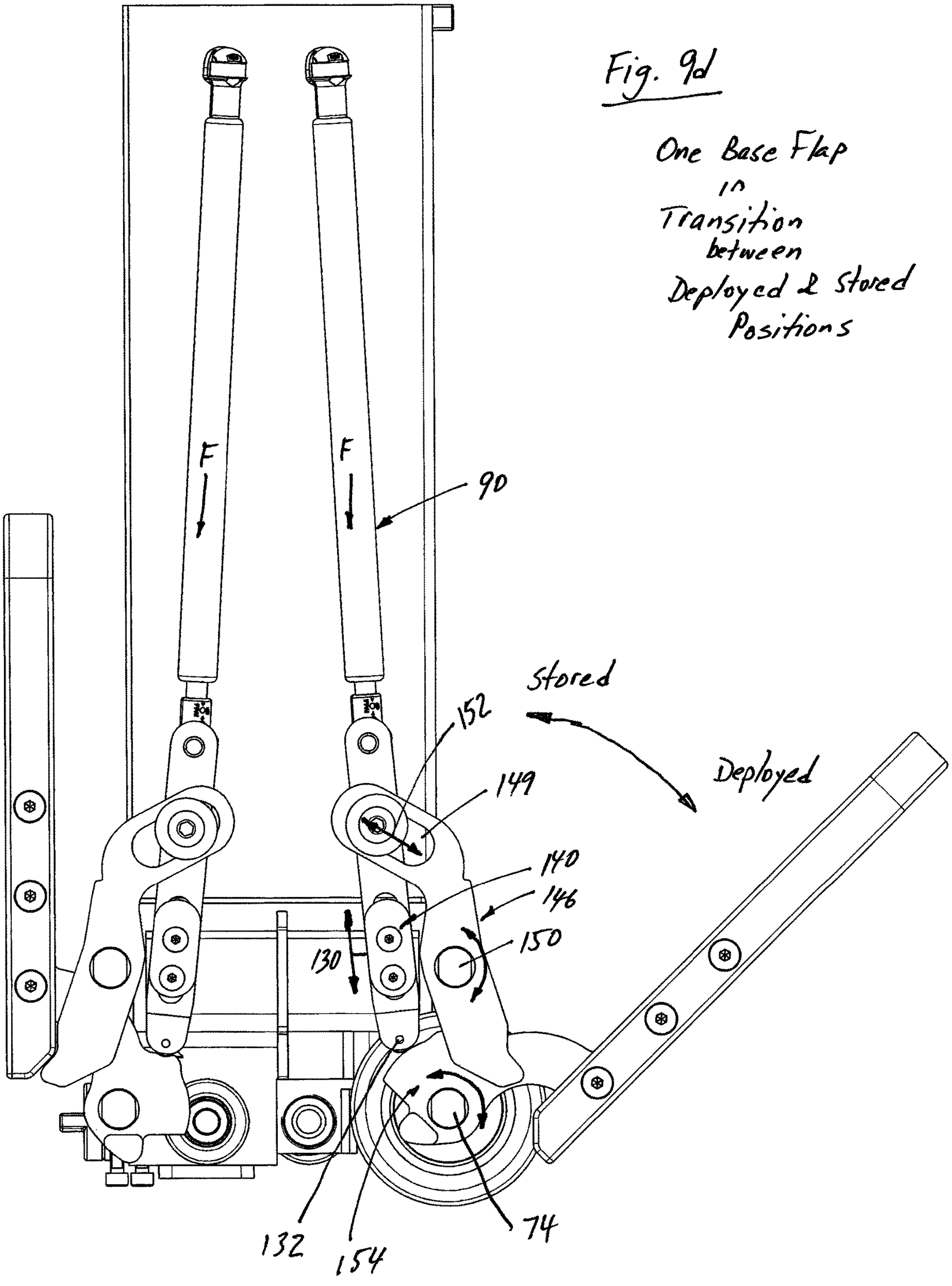

Base flaps 28, 30 can be deployed individually (as illustrated by arrows in FIGS. 3, 9*c*/9*d* and also in FIG. 6) between a stored (or retracted) position close to the respective front and rear housing sides (see FIG. 9*a* also) and a fixable, fully deployed position extending substantially perpendicular to the respective housing sides 14, 16 and abutting on the stand surface (ground level), see also FIG. 9*b*. The permanent articulated mounting of stand flaps 28, 30 to the station's housing 12 ensures these need not be removed for transport and storage when the station is not in use. No separate mounting/assembly is therefore required when deploying station 10.

To assist in the transportation of station 10 to a place where it is to be temporarily deployed, two coaxially spaced apart transport wheels 24, 26 are mounted using respective axle bolts 74 near the front lower edge of housing 12 to respective lateral side flanges 68, 69 either side of traverse front frame section 22 to which bottom panel 20 is fastened, see FIG. 7. It will be appreciated that the location of the wheels 24, 26 could be at what is the rear face of housing 12 instead. In other words, identifying a front and a rear side or face of the station is arbitrary.

Figure 3:
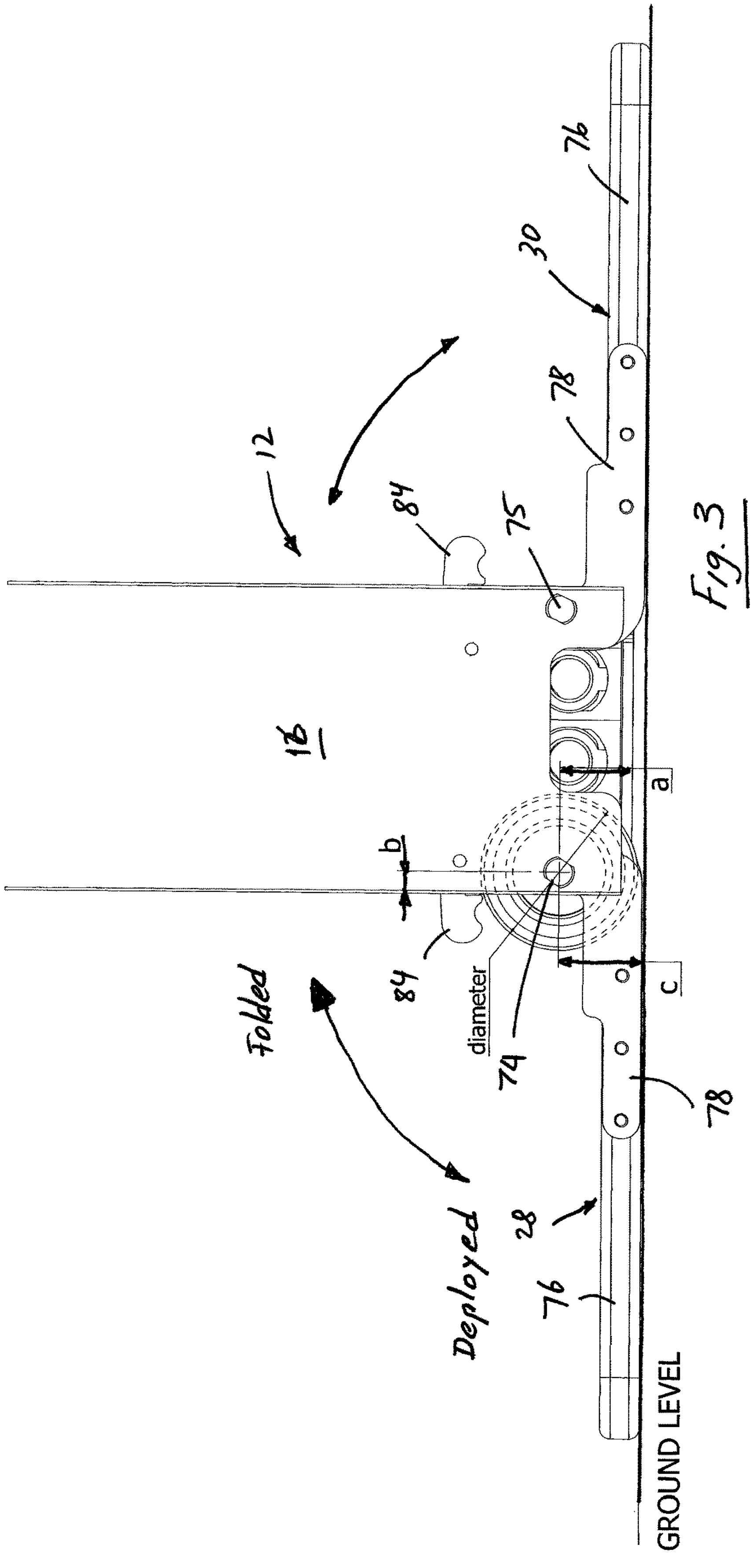
FIG. 3 is an enlarged side elevation of the lower end of the station of FIG. 1 with the base flaps in fully deployed state.

Wheels 24, 26, comprise a metallic hub on which are mounted (or integrally formed) tyres made of soft rubber or another polymer material As seen in FIG. 3, the diameter d of wheels 24, 26 and the specific distance a of the axis of the axle bolts 75 from the bottom plate 20 as well the distance b of the axis from the front lower panel 60 of housing 12 are chosen such that the periphery of wheels 24, 26 protrude from the bottom face as well as the front face of housing 12 by a specified amount. The dimensions are chosen in particular to allow the station 10 to be inclined so it can be wheeled/rolled for transportation purposes, see FIG. 6 with the front base flap 28 in its stored away position.

As explained in more detail below, at least one but preferably both of the base flaps 28, 30 is/are shaped and/or articulated to the housing framework near the bottom of housing 10 in such manner that when being moved into and reaching their fully deployed, horizontal position, wheels 24, 26 are lifted by a predetermined small distance from the stand surface/ground level. This increases stability and counters against sliding of the station with its deployed rear and front base flaps 28, 30.

Front and rear base flaps 28, 30 have a width similar to the width of housing 12, and preferably a length approximately ⅙ to ¼ of the height of housing 12, thus increasing inertia moments once deployed to stabilise station 10. Base flaps 28, 30 are essentially comprised of a rectangular metallic or composite, high rigidity plate 76 secured between two metallic mounting profiles or brackets 78, 80. Mounting profiles 78, 80 are forged or moulded L-sections. Alternatively, the plate 76 and L-sections 78, 80 could be cast as a unitary body.

The front base flap 28 will be seen in FIGS. 3 and 7 to be supported by and pivoted at the aforementioned mounting axle bolts 74 which secure the wheels 24, 26, between the inner lateral side flanges 68, 69 either side of front traverse frame section 22 and the lateral side panels 14, 16 as is best seen at the bottom side of FIG. 7.

The rear base flap 30 will be seen in FIGS. 3 and 7 to be supported by and pivoted at mounting axle bolts 75 between the inner lateral side flanges 68, 69 either side of rear traverse frame section 23 and the lateral side panels 14, 16 as is best seen at the bottom side of FIG. 7. The pivot axis of rear base flap 30 is parallel to the pivot axis of front base flap 28 and has the same spacing distances a and b towards the bottom plate 20 and rear lower panel 61 mentioned above in the context of the wheel pair axis.

That is, L-profiles 78, 80 are respectively pivoted near the intersection of their longer leg portion 82 at which plate 76 is secured using suitable screws or bolts, and their shorter leg portion 83, at the width-ward sides of the lower part of housing 12. The base plates 76 have a suitably patterned or shaped surface on the face which in deployed state of the base flaps 28, 30 abuts the ground surface. This increases frictional engagement between base flaps 28, 30 and stand surface when the former are deployed.

As noted above, front base flap 28 is articulated at housing 12 about a same axis of rotation as that common to the pair of support wheels 24 and 26. The axis of rotation is located close to the front side lower edge of housing 12 such that the housing may be tipped over in controlled manner and the wheels 24, 26 maintain ground engagement. Such tipping can be effected once the front-side base flap 28 is in its stored position in which it extends substantially parallel to the front face of housing 12, such that the unit can be moved like a two-wheeled transport trolley from/to its deployment location.

Figure 6:
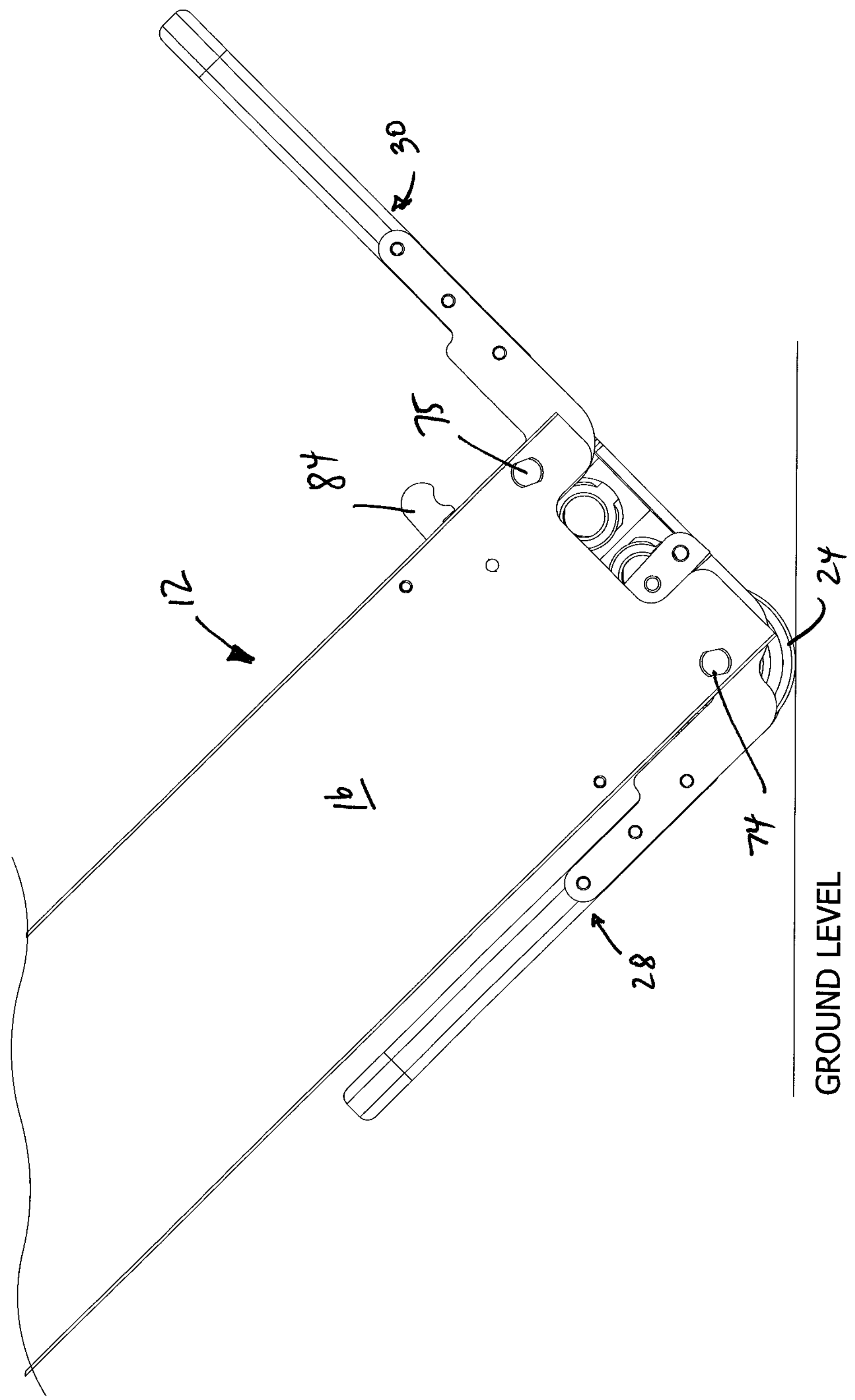
FIG. 6 is a partial side elevation similar to FIG. 3 of the station tilted for transport using its on-board wheels.

Furthermore, this preferred arrangement enables station 10 to be tilted about the lower front edge, more precisely about the axis of rotation of the unit's pair of wheels 24, 26, with only the base flap 28 sharing this axis of rotation having to be unlocked and pivoted into its storage/transport position. The other base flap 30, at the rear side/face of housing 12, may remain in its fully deployed position. In that way, the still deployed base flap 30 may serve as a temporary surface for transporting boxes and other equipment together with the station (FIG. 6).

One further characteristic feature of station 10 is an arrangement whereby the transport wheels 24, 26 are lifted from the stand surface (ie ground) automatically as part of the deployment of in particular the front base flap 28 from its storage position into its fully deployed horizontal orientation. This is not consequence of the front base flap 28 sharing the axle (bolts 74) of the wheel pair 24, 26, rather by providing that a distance c (see FIG. 3) of a lowermost ground-engaging surface of the base flap plate 76 or the L-mounting profiles 78, 80 to the axis of rotation is set to be a few millimetres to a few centimetres larger than the diameter of the transport wheels 24, 26 located at the front bottom edge of housing 12.

Figure 4:
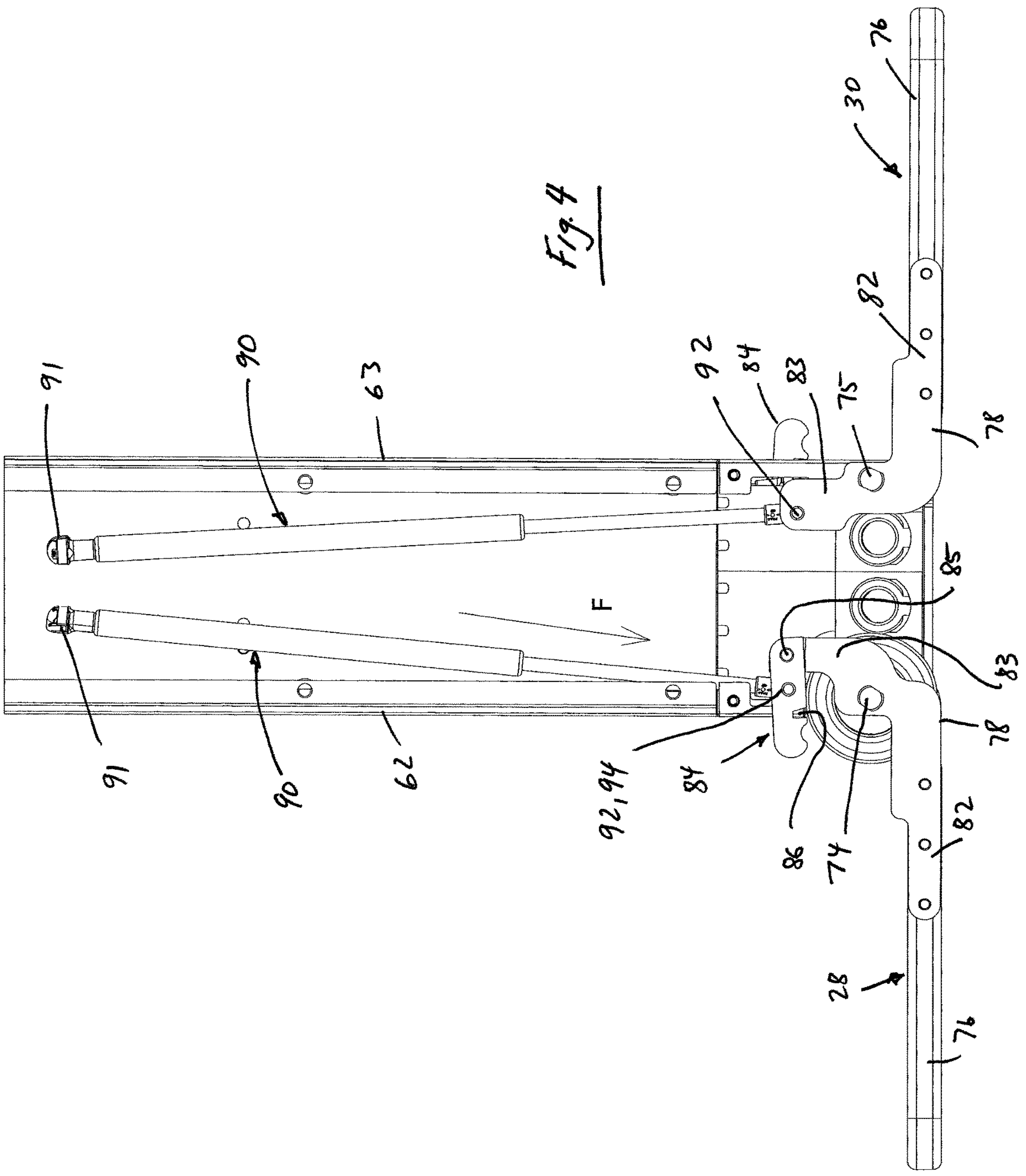
FIG. 4 is a partial side elevation of the lower end of the station of FIG. 1 with its lateral side panel removed and the base flaps in fully deployed state, for the purpose of illustrating in greater detail components of a first embodiment of a locking arrangement (arresting mechanism) for locking the station housing's base flaps in their fully deployed state.

Given that the relevant base flap 28 pivots off the same axis of rotation (or shaft) used by the wheels 24, 26, it is preferred that the base flap 28 exhibits a somewhat rounded profile at the ground-engaging side closest to the axis of rotation, to facilitate full rotation of the base flap 28 into its fully deployed position after that rear part first engages with the ground during the flap's pivoting movement and subsequently lifts the wheels of the ground. In the embodiment illustrated, it will be noted that the L-brackets 78, 80 of the front base flap 28 have an inwardly recessed knee at the intersection between the longer and shorter leg portions 82 and 83, thereby allowing wheels 24, 26 to remain in contact with the ground when the housing 12 is tilted over, see FIGS. 4, 5 and 6.

The station 10 further comprises for each base flap 28, 30 one (but it could be two) arresting or locking mechanism to arrest/lock the base flaps 28, 30 in the deployed positions. A first embodiment is illustrated in FIGS. 2*b* at Detail A, and FIGS. 3 to 7, and a second embodiment is illustrated in FIGS. 9*a* to 9*d*. The arresting mechanisms are devised to automatically lock and positionally fix the base flaps as each flap 28, 30 is moved into and upon reaching its fully deployed position where it extends perpendicular from the front (rear) face of housing 12, respectively. These mechanisms replace a need for separate manual handling of locking members, such as locking pins, to secure the deployed position of the base flaps 28, 30 at housing 12. The arresting mechanisms in particular also serve to prevent the flaps 28, 30 from being folded back onto the housing 12 when the latter is under lever loads. On the other hand, the arresting mechanisms are also devised for easy manual release of the locked position.

Turning first to the first embodiment of the arresting mechanism illustrated in FIGS. 2*b*, and 3 to 7. As previously hinted, two arresting mechanisms could be provided for each base flap 28, 30 at both width-ward sides of housing 12, but in the illustrated embodiments only a single arresting mechanism is provided per base flap.

Each of the arresting mechanisms is comprised of a pivotable locking latch arm 84 (also referred herein as a toggle strap) and an associated biasing element 90.

Locking latch arm 84 has an arrester notch 86 about a third way in from a free terminal end of the arm 84 and is secured near its opposite terminal end in articulated manner (pivot point 84) to the end of shorter leg portion 83 of one of the L-profiles 78, 80 of flaps 28, 30. Arrester notch 86 can be brought into and out of engagement with a retainer ledge, see detail D in FIG. 2*b*, provided at a through-hole or opening 88 at front and rearward facing framework uprights or lateral side panels 14, 16 of housing 12, during rotation of base flaps 28, 30 from their deployed to their storage positions, and vice-versa.

The biasing element 90 is provided in the illustrated embodiment by a pressure gas spring, in this case a linear cylinder—piston actuator 90 biased against compression, extending about vertically within housing 12. Biasing actuator 90 is pivotally secured at its upper cylinder end 91 at a fixed location to an internal side panel (illustrated) or a traverse section (not illustrated) of the housing framework. Actuator 90 is also secured pivotally at its lower free end 92 near to or at a guide pin/follower cam 94 positionally fixed and carried around midway at locking latch arm 84. That is, the lower end 92 will move in unison with rotation of locking latch arm 84.

The pivoting points of and mounting geometry of actuator 90 are such that it exerts a normal force seeking to linearly extend the lower movable (rod) end 92 away from its upper (cylinder) fixed connection point 91 and depending on the spatial location of the lower end 92 positively biases locking latch 84 anticlockwise so that it can remain in its deployed, flap-movement arresting position in which arrester notch 86 remains engaged at its counterpart ledge at opening 88 (right hand side of the illustration in FIG. 4; see also detail of FIG. 2*b*) when base flap 28 (and 30) is (are) in the deployed position(s).

Figure 5:
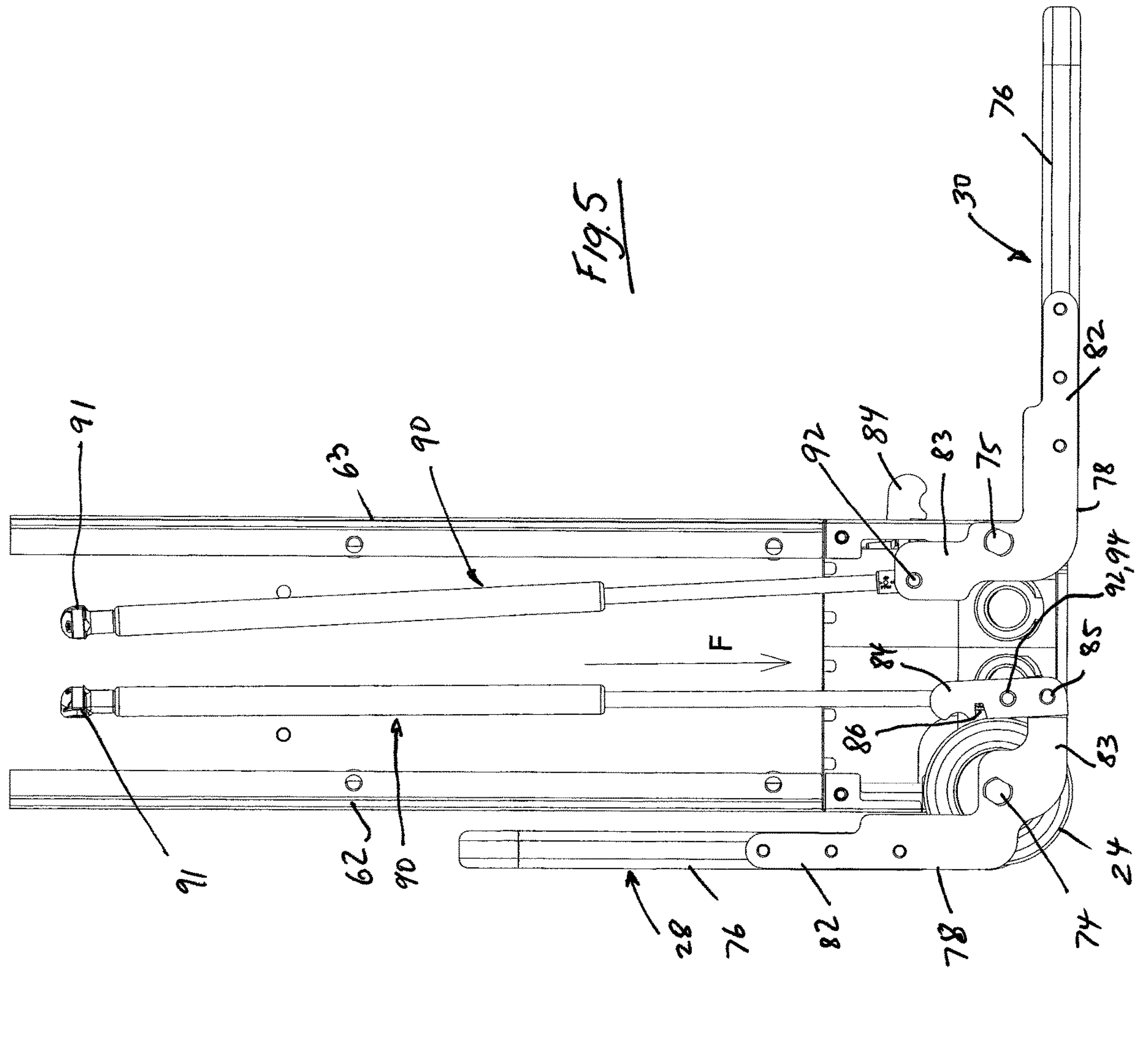
FIG. 5 is a partial side elevation of the lower end of the station similar to FIG. 4 but with one of the base flaps in its storage position.

As will be noted from FIG. 5, in the stored position of front and rear base flaps 28, 30, the actuator force on latch arm 84 (and associated L-profiles 78 or 80) is directed essentially vertically and does not impart a torque on locking latch arm 84 about its pivot-joint 85 to the respective L-profiles of base flaps 28 and 30.

It will also be noted that each base flap 28 and 30 has two actuators 90 associated therewith, one on each width ward side on the lateral sides of housing 12, but in the illustrated embodiment only a single locking latch arm 84.

The geometric arrangement of fixed and movable pivots 91, 92 of actuators 90, as well as the location of the axes of rotation of base flaps 28, 30 at housing 12 are chosen and correlated such that the force exerted by actuators 90 primarily seeks to bias the base flaps 28 and 30 into their deployed state where they extend perpendicular to the front and rear faces of housing 12. Rotation from the deployed state into the retracted or stored state is initially effected against the biasing force, whereas once a certain rotation degree towards the stored state is past, actuators 90 will seek to assist in slightly biasing the base flaps 28, 30 to maintain the stored positions where these extend parallel to the front and rear faces of housing 12.

The arresting mechanism is furthermore configured to be manually releasable. To this end, locking latch arm 84 comprises an integral lever portion extending from its notch (86) location to its terminal free end protruding from the lower front or rear panels 60, 61, as the case may be. The release function for each of the base flaps 28, 30 is thus easily accessible from the front and rear side, respectively, of housing 12. The lever portion will be dimensioned such that the lever action that can be imparted is sufficient to overcome the biasing force F exerted by actuator 90 onto the locking latch 84, and move the locking latch 84 out of engagement with the retainer ledge at opening 88.

Locking latch arm 84 also includes guiding pin/follower cam 94 mentioned above, which protrudes sideways from both faces of arm 84. The follower cam 94 engages/is received within a curved slot formed at the housing 12 by respective complementary arcuate channels or grooves 70 at integral mounting flange portions of lateral side panels 16 and 14 on the one hand, and arcuate channels or grooves 71 at the respectively facing inner mounting flange 68 and 69 which support both the wheels 24, 26 and base flaps 28 and 30, on the other; see FIG. 7.

In similar fashion, the L-profiles 78, 80 of base flaps 28, 30 opposite to those carrying a latch arm 84, ie those that do not carry such, also comprise a similar guide pin/follower cam 95 near the end of shorter L-arm 83 as seen on the top right-hand side corner in FIG. 7.

It will be understood that the diameter of follower cam 94 at latch arm 84 is smaller than the width of curved slot 96 near the terminal end closest to the front (as compared to the bottom) face of housing 12. Alternatively, arcuate slot 96 may have a width slightly greater than follower cam/guiding pin 94 to ensure controlled movement of the base plates 28,

30 during rotation between deployed and storage positions, but terminate in a downward pointing portion which will enable the latching arm 84 to be pushed downwards by the associated actuator 90 for its notch 86 to move into and remain in biased engagement with the arresting ledge at opening 88.

Curved (arcuate) slot 96 thereby also promotes guidance of the locking strap/latch arm 84 during rotation of base flaps 28 and 30 between stored and deployed positions, also thereby ensuring that the locking latch 84 is correctly orientated and directed to engage with its cooperating retainer at the housing.

Turning next to the second embodiment of the arresting mechanism as illustrated in FIGS. 9*a* to 9*d*. It should be noted that same reference numerals are used for components that are functionally equivalent to those already described with reference to the first embodiment. Other than mentioned below, other components of the unit 10 are the same as previously described. Also, in order to not clutter all FIGS. 9*a* to 9*d*, most if not all components of the arresting mechanism are identified and described with reference to FIG. 9*a*.

In the second embodiment, the arresting mechanisms for the front and rear side base flaps 28, 30 are identical to each other as is apparent from the figures, and each is essentially comprised of four co-operating functional units and components, namely a biasing actuator 90, a locking latch member 130 acted upon by the biasing actuator 90, a pivoted release lever 146 coupled to the locking latch member 130 in a manner that enables the latch member 130 to be moved (displaced) against the biasing force exerted by the biasing actuator 90 and a locking cam 154 disposed to rotate together with the respective base flap 28, 30 and about their respective axles 74/75, the locking cam 154 cooperating with the locking latch member 130 to arrest rotational movement of the base flap 28, 30 when in and from the fully deployed state to the retracted state.

In detail, it will be noted that biasing actuator 90 is embodied again as a pressure gas spring, in this case a linear cylinder-piston actuator biased against compression, having an upper end of its cylinder suitably secured in pivoted manner at fixing point 91 to a frame member (not shown) of housing 12, whereas the lower terminal end of its piston rod is secured at pivot axle 92 to an upper, free terminal end 131 of the bar-or rigid strap-like locking latch member 130. Locking latch member 130 is held at a frame section 144 of housing 12 by a retainer 140 in a manner that allows restricted to-and-fro linear motion of it along an axis slightly inclined to Vertical, but hinders rotation. Retainer 140 heretofore comprises a retainer plate 141 and two bolts 142 parallel spaced apart and fixed to frame section 144, the bolts 142 extending through a longitudinal through-hole (guide slot) 133 of member 130, in essence providing a sliding block guide.

It may further be gleaned from FIGS. 9*a* to 9*d*, that a lower terminal free end 132 of latch member 130 carries a follower roller which is barely visible but whose axis of rotation is indicated at 134.

In the embodiment illustrated, it will also be seen that locking cam 154 is integrally formed at the shorter arm 83 of one of the mounting profiles/brackets 78/80 of the base plate 28/30, the mounting profile 78/80 still roughly resembling an L-profile but one in which the shorter arm 83 curves away from its juncture with the longer arm 82. At 74 and 75 are indicated the mounting bolts/axles which provide the hinge connection of the front and rear side base flaps 74 and 76 to the housing 12. Of course, a separate cam disc could be provided instead, a requirement then being that it be suitably secured against rotation with respect to the base flaps 28, 30 so that the cam discs rotate with the flaps about axles 74, 75.

Each locking cam 154 has or defines a guide surface 156 curving about the rotation axis (provided by axles 74/75) about which base flaps 28, 30 rotate, the aforementioned follower roller 134 of the locking latch member 130 being biased by actuator 90 to maintain engagement with and ride the guide surface 156 of the locking cam in crank-like manner during rotation of the hinged base flap 28/30 between its stored and fully deployed position. In essence, the actual contour of the guide surface 156 (ie the radial distance of any given guide surface section from the rotation axis at 74/75) will dictate whether and to what extent the locking latch 130 will move to and fro along the retainer 140 against the force imparted on it by the actuator 90.

It will be further noted that a radially-inward directed step (or depression) 158 is formed at one end of the about quarter-arc length cam guide surface 156, coinciding with the rotational position in which the base flap 28/30 attains its fully deployed state, as illustrated in FIGS. 9*b* and *c*. Near towards the opposite end, the cam guide surface 156 has a radially outwards directed, shallow hump 159.

The step/depression 158 at the end of the guide surface 154 provides a locking stop (at the step 158) for the locking latch member 130 into which it's follower roller 134 will be biased/moved by actuator 90 during rotation of the base flap 28/30 when reaching its fully deployed state as illustrated in FIGS. 9*b* and *c*. This arrangement mimics a ratchet and pawl mechanism whereby rotation of the base flap 28/30 into its fully deployed position (and thus of the cam 154) causes the lower terminal end 132 of the latch member 130 to move into the stepped depression 158, whereby rotation in the opposite direction towards the retracted position is inhibited by the steep step surface, thereby effectively locking the base flap 28/30 in its deployed state.

The small hump 159 of the guide surface over which the terminal end (ie follower roller 134) of the latch member 130 will ride immediately before the base flap 28/30 is rotated into its stored (or closed) position illustrated in FIG. 9*a*, together with the biasing actuator 90, assists in maintaining the base flap 28/30 in its stored position, thereby obviating a separate mechanism to lock this position. Instead of a hump, a very shallow and gently-sloped depression could be provided to secure this position.

A release mechanism is provided to release the locked position of locking latch member 130 at cam step 158. To this end, a single piece, rigid release lever 146 is pivotally secured to aforementioned frame section 144 of housing 12 near its centre about bolt axle 150. The freedom of rotational movement of the lever 146 is constrained/limited by a further sliding block guide which couples an upper terminal end 148 of lever 146 to a retainer and follower bolt 152 fixed to one side of locking latch member 130 located upwards from the guiding slot 133 for the latch member's retainer 140. The follower bolt 152 locates and extends through a guide slot 149 (long hole) formed in the angled upper terminal end 148 of release lever 146.

It will be appreciated that this articulated coupling of release lever 146 and locking latch member 130 enables the latch member 130 to be moved (displaced) upwards against the biasing force exerted by the biasing actuator 90 by pushing (exerting sufficient force on) the lower terminal end 147 of release lever 146 downwards whereby rotation about axle 150 causes the upper angled end 148 of release lever 146 to rotate counter direction wise and consequently forcibly displace follower bolt 152 from its initial position near or at a lower terminal end of guide slot 149 towards the final (restrained) position at an upper terminal end of slot 149 and in the process raise the lower terminal end 132 of locking latch 130 out of engagement with step 158 of locking cam 154. It will be appreciated that geometrise/dimensions of the individual components and relative positioning thereof can be chosen such that the described lever action is sufficient to impart a release moment sufficient to overcome the biasing force exerted by the biasing actuator 90 onto the locking latch member 130.

FIGS. 9*a* to 9*d* respectively illustrate the portable water dispensing unit in a state (a) in which both base flaps 28, 30 are in a fully retracted (or closed) transport position, whereby the bias F exerted by actuators 90 onto locking latch members 130 and the presence of the shallow retention hump 159 at clocking cam 154 assist in keeping the base flaps 28, 30 folded up against the housing 12:

in a state (b) in which one of the base flaps 30 has been rotated into its fully deployed and arrested/locked position to extend perpendicular from the (front) housing face and in which the lower end of locking latch member 130 has been biased to locate in the stepped depression 158 of locking cam 15;

in a state (c) in which the fully deployed base flap 30 is no longer arrested against rotational movement as consequence of the release lever 146 having been depressed to cause the lower end of locking latch member 130 to locate above and outside of the stepped depression 158 of locking cam 15; and in an intermediate state (d) in which the base flap 30 is freely rotatable between the fully deployed and fully retracted states wherein the follower roller 134 of the locking latch member 13 travels along the guide surface 156 of locking cam 154 without hindering deployment.

Figures 2A, 2B:
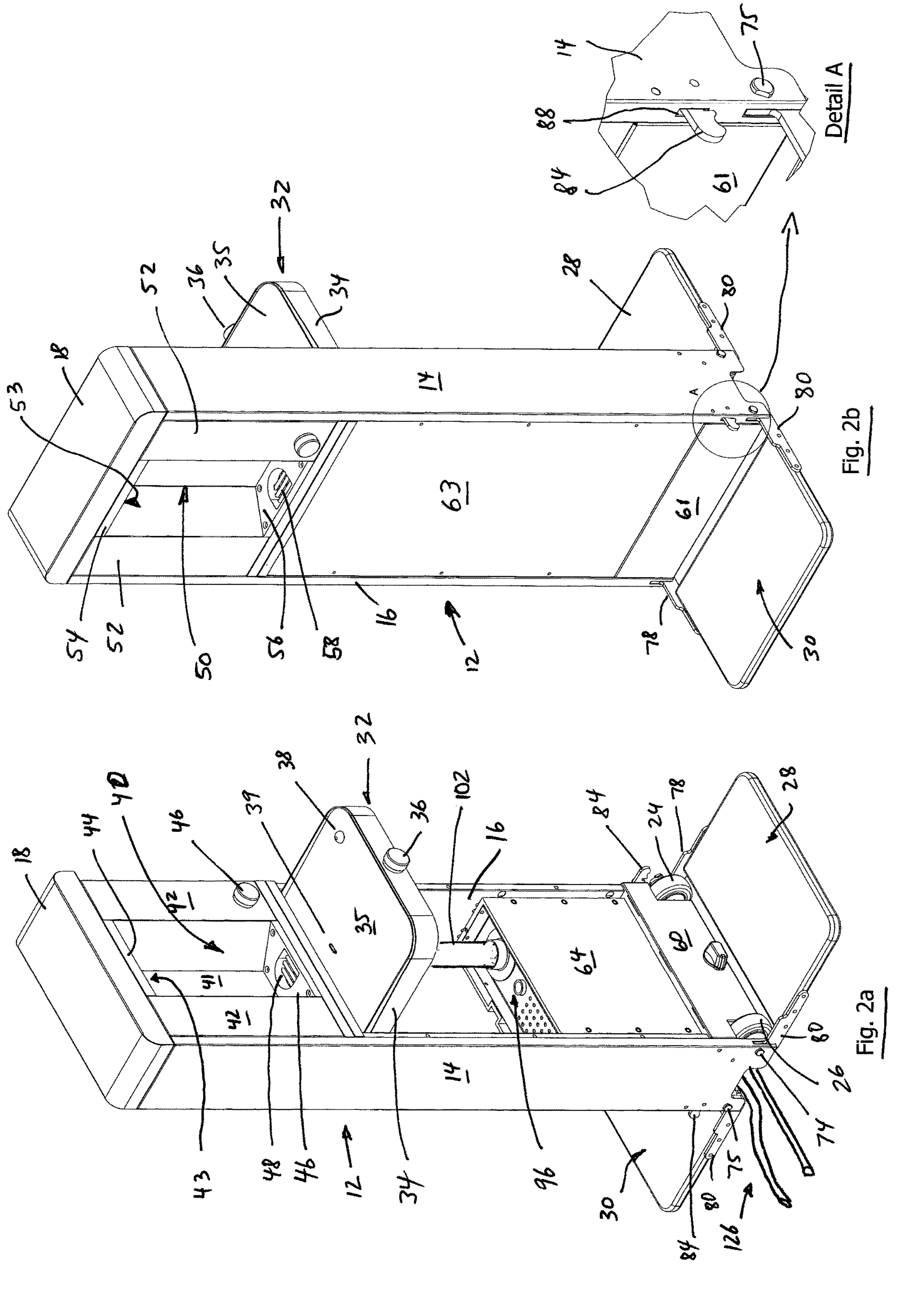
FIGS. 2*a* and 2*b* are front and rear side perspective views of a second embodiment of the invention, the station being similar to that of FIG. 1 but for incorporating a foldable water fountain tray mounted to the housing and shown in a deployed state, with a front panel removed to show a water ballast tank mounted in the housing, the foldable base flaps shown in a fully deployed, in-use state of the station.

Reverting then to the further layout of station 10, FIGS. 2*a* and 2*b*, it has three water dispensing outlets, whereas the embodiment of FIG. 1 has two. Two of these are devised as water bottle filling locations 40, 50, respectively located on the top half at the front and rear sides of housing 12 within a recessed cavity 41, 51 formed by an upright sheet panel extending between side panel portions 42, 52. Within recess 41, 51 is located a support stand surface 46, 56 for receiving and supporting a drinking container (bottle) in upright standing position.

The actual water dispensing spouts are not visible in the figures but are received within shrouds 44, 54 overhead the cavities/recesses 41, 51 so as locate above a bottle received within cavities 41, 51 and to hinder direct contact with the container filling outlet.

The support stand surfaces 46, 56 of each water bottle refill location 40, 50 will include a spill-over drainage inlet (covered by a grate or suitably tight-meshed strainer) 48, 58 connected to water drainage pipework received within housing 12.

The third water dispensing outlet 38 is incorporated in a traditional bubbler-style drinking fountain 32 present at a tray 34 which, however, rather than being fixed and stationary at housing 12, is articulated between two upright framework sections at the front of housing 12, immediately below the front water bottle re-fill location 50. This enables the hinged bubbler tray 34 to be deployed between an arrestable folded-down transport position about flush with the front face of housing 12 and an arrested but releasable deployed position in which the tray 34 extends about perpendicular from the housing's front side, as illustrated in FIG. 2*a*. The skilled person will be cognisant of various mechanisms that can be implemented in securing the arrested and deployed state of tray 34 and these are thus not illustrated nor described herein in further detail.

The tray 34 will advantageously be located at a height suitable for access by people in wheel chairs and/or children. The tray will advantageously have a top surface 35 which is concave, draining towards a drainage channel or drain hole 39 which in turn is in communication with the internal drainage pipework of station 10. Incorporation of a folding drinking fountain tray 32 makes the station 10 compact and easier to transport and store while not in use.

Each water dispensing outlet 32, 40 and 50 is arranged to be actuated independently by way of a respective actuator 36, 45, 55, wherein each actuator is disposed at a location on housing 12 which is in vicinity of its respective outlet. The skilled person is cognisant of various ways how water flow through the dispensing outlets can be regulated and accomplished, eg push-button shutter valves, twist-handled shutter valves, turn-knob shutter valves, etc.

As noted, station 10 comprises internal water drainage pipework plumbed to drain water spilled from the water dispensing outlet(s) into associated drainage inlets towards an externally accessible water drainage coupling of the unit. In similar fashion, an internal water supply pipework will be plumbed to supply water from an externally accessible water inlet coupling at the housing to the multiple water dispensing outlets arranged at different points about housing 12.

The skilled person will appreciate that there are multiple ways in which the hydraulic water supply pipework as well as the drainage pipework of station 10 may be embodied, with appropriate hydraulic equipment components known in the art, such as mains water pressure reducers, flow-switching and/or shut-off valves, couplings to connect the station to a mains water supply and to a drainage facility, rigid and flexible water pipes, etc. Consequently, the hydraulic set-up will not be described in further detail; and illustration of the supply and drainage pipework has been omitted from FIG. 2*a* and others, as the set-up is not related to the specific aspects of the invention described above.

The skilled person will also appreciate that there are various types of suitable water inlet and outlet couplings that can be employed in station 10. The embodiment illustrated shows a station 10 that can be connected in series with other similar stations to provide a bank of interconnected stations in similar fashion to that described in patent publication US 2015/0101119 A1, the contents of which is incorporated herein by way of short-hand cross-reference in so far as water supply and drainage pipeworks are concerned. The water supply, drainage and station-interconnecting couplings 120, 122 and 124 illustrated in FIG. 7 are illustrative only and provided on opposite width-ward sides within the housing zone closed off by the removable lower front and rear panels 60, 61 of housing 12, as can be seen from FIGS. 3 and 7. These couplings 120, 122 and 124 enable water supply and drainage hoses (illustrated schematically at 126 only in FIG. 2*a*) to be connected to the station's internal water supply and drainage pipework.

Figure 8B:
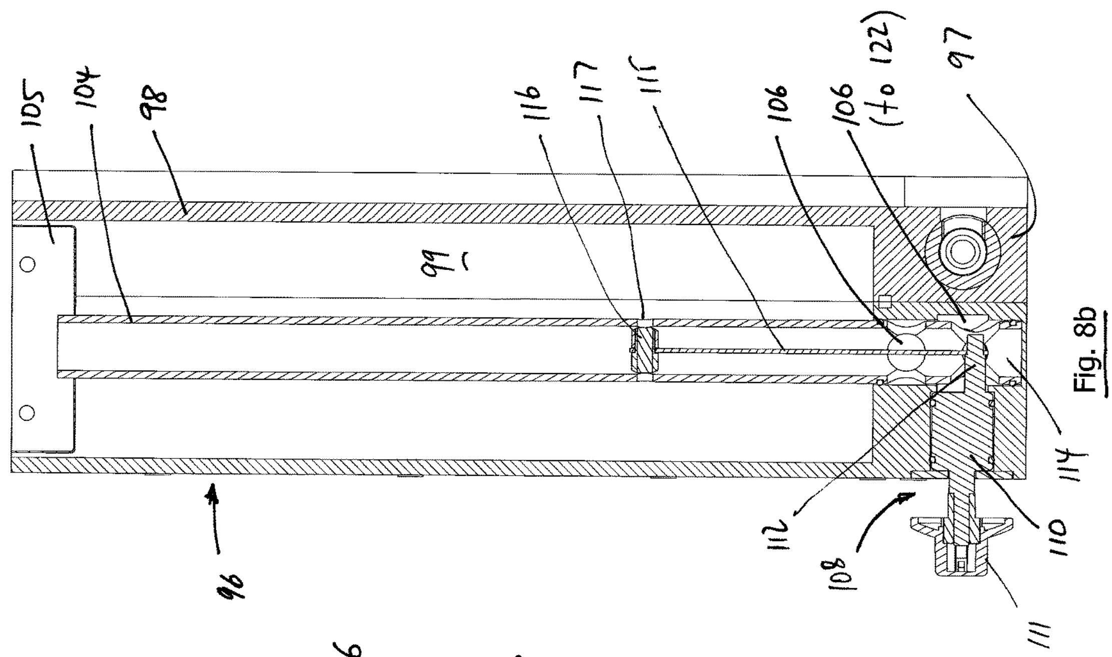
FIGS. 8*a* and 8*b* are different sectional views of the water ballast tank arranged within the housing of the station of FIGS. 1 and 2*a* and 2*b*.
Figure 8A:
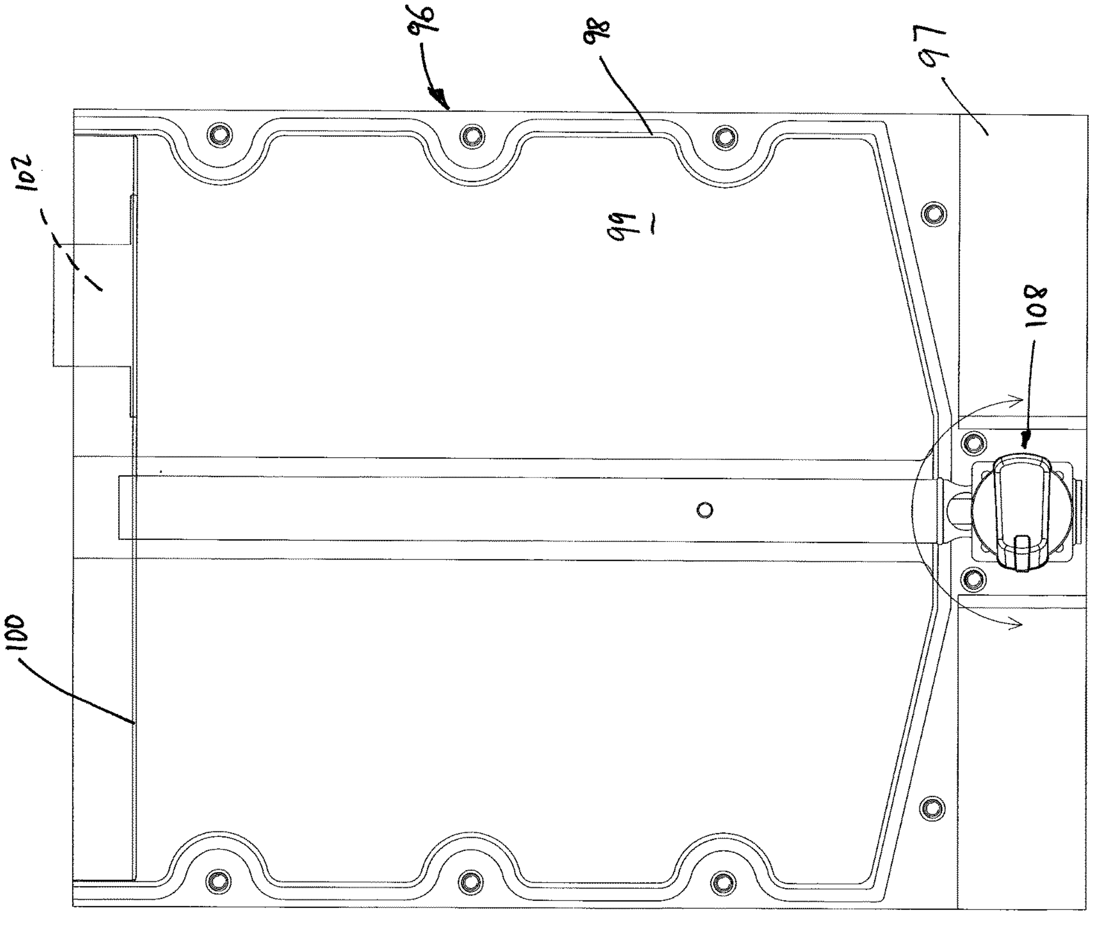

In order to further increase stability of the station 10 (also termed unit herein) when deployed, a polymer blow-moulded water ballast tank 96 with a typical capacity of between 8to 15 litres is received in the aforementioned ballast tank casing 66 located within the lower part of housing 12 as shown in FIG. 2*a*. Two sectional views of tank 96 are depicted in FIGS. 8*a* and 8*b*.

Ballast tank 96 is moulded from a suitable polymer material by injection or rotational moulding and comprises a solid base block 97 with internal discharge channels (eg 106, see below) and a peripheral wall 98 surrounding the tank cavity 99. A baffle plate 100 closes the open top of tank 96 for stopping water inside the tank splashing if the housing 12 is moved or knocked by someone; baffle plate 100 is devised to prevent the water in the ballast tank 96 being carried by the initial inertia of the applied force, and to stop the transfer of momentum which could create a knock-on effect and topple the unit 10 over.

As can be seen from FIG. 2*a*, in the depicted embodiment, ballast tank 96 has a tank water supply pipe 102 secured to a fixture at baffle plate 100 and plumbed to the internal water drainage pipework which receives spill water off the water bottle filling locations 40 and 50 as well as the drinking fountain 32. In this way, tank 96 can be filled prior to using the station with water supplied from one or more of the water dispensing outlet(s) of bottle refill locations 40, 50 and bubbler 32 via their respective drains 48, 58 and 39.

Alternatively, ballast tank 96 could have a valved tank water inlet located in tank wall 98 plumbed to the internal water supply pipework which supplies water bottle filling locations 40 and 50 as well as drinking fountain 3 from the mains water coupling 120 of station 10, so that it can be filled prior to station 10 being readied for use.

Once ballast tank 96 is filled, it lowers the centre of gravity of the station and increase stability of housing 12 against being tipped-over.

Noting that water ballast tank 96 is plumbed to receive drainage water, it could be provided with a shut-off valve that prevents drainage water being supplied to tank 96 once station 10 is in normal use after tank 96 is filled to provide the ballast functionality. Alternatively, and this embodiment is shown in FIGS. 8*a* and 8*b*, it is preferred for tank 96 to be fully incorporated hydraulically into the internal water drainage pipework.

That is, one can dispense with a separate valved tank filling arrangement, and instead spill water drainage from the station's water outlets at 32, 40 and 50 via the associated drainages 39, 48 and 58 is always accomplished via directing it first into and then from ballast tank 96 to waste via the station's drainage water outlet coupling 122. To this end, it is necessary to have a tank overflow prevention mechanism, which in its simplest form is a tank-internal weir structure from where spill water above a certain fill-degree of tank 96 is continuously removed. In the illustrated embodiment, the weir structure comprises a tank-internal riser pipe 104 with its upper terminal end located in tank headspace 105, secured with its lower terminal end in a drainage channel in base block 97 and plumbed to the station's drainage water outlet coupling 122 via outlet channels 106 in block 97 below the terminal end of riser pipe 104.

Water in the ballast tank's cavity 99 will add considerable mass to the housing 12 which will increase stability but restrict transportability of station 10. The need to drain ballast tank 96 after the station is no longer in use is paramount to being able to move station 10 with ease.

Consequently, to facilitate full drainage of tank embodiments which are provided with riser tube 104 as fill-control, a cam-valved drainage arrangement 108 is present in base block 97. A 180 degrees rotatable cylindrical valve body 110 with associated external turning knob 111 and internal rear cam plate 112 is received sealingly within a bore in base block 97 such that rear cam plate 112 extends into the tubular recess 114 which receives riser tube 104. Cam plate 112 secures push rod 115 extending upwards within riser tube 104 which in turn carries closure plug 116 which serves to selectively block discharge holes 118 in riser tube 104 as a function of rotational position of valve body 110. This arrangement enables quick drainage of water from tank 96 via discharge openings 106 in base block 97 towards the station's drainage water outlet coupling 122.

The skilled person will appreciate that the above described and in the figures illustrated embodiment may be modified without the need to add skills beyond those available to the skilled worker in the art. For example, the biasing actuators 90 may be replaced with other biasing arrangements, such as torsional springs acting on the locking latch 84.

The materials and components employed in the manufacture of the housing/cabinet 12 are also known to the skilled worker, and whilst a metal housing using sheet metal and sections is preferred, some of the panels could be replaces with impact resistant polymer sheets made of ABS or similar.

REFERENCE NUMBERS AND COMPONENT/FEATURES CONCORDANCE LIST

| | |
|---|---|
| 10 | Portable water dispensing station |
| 12 | housing |
| 14 | lateral side panel |
| 16 | lateral side panel |
| 18 | top cap |
| 20 | bottom panel |
| 22 | front traverse frame section |
| 23 | rear traverse frame section |
| 24 | wheel |
| 26 | wheel |
| 28 | front folding base flap |
| 30 | rear folding base flap |
| 32 | drinking fountain, foldable |
| 34 | tray, hinged to frame of housing |
| 35 | concave tray surface |
| 36 | water fountain dispensing actuator |
| 38 | water fountain dispensing spout |
| 39 | drain in tray surface 35 |
| 40 | front water bottle re-fill location |
| 41 | front recess |
| 42 | side panels |
| 43 | water dispensing spout (not illustrated) |
| 44 | overhead shroud of dispensing spout |
| 45 | water dispensing actuator |
| 46 | bottom stand surface |
| 48 | grated drain |
| 50 | rear water bottle re-fill location |
| 51 | rear recess |
| 52 | side panels |
| 53 | water dispensing spout (not illustrated) |
| 54 | overhead shroud of dispensing spout |
| 55 | water dispensing actuator |
| 56 | bottom stand surface |
| 58 | grated drain |
| 60 | front lower panel |
| 61 | rear lower panel |
| 62 | front panel |
| 63 | rear panel |
| 64 | front middle panel of casing for ballast tank |
| 66 | ballast tank casing |
| 68 | wheel and base flap inner mounting flange |
| 69 | wheel and base flap outer mounting flange integral with 14 and 16 |
| 70 | inner guiding groove half at 68 |
| 71 | inner guiding groove half at 69 |
| 72 | guiding groove |
| 74 | front base flap & wheel mounting bolt/axle |
| 75 | rear base flap mounting bolt/axle |

-continued

| | |
|---|---|
| 76 | base flap plate |
| 78 | L- mounting bracket |
| 80 | L- mounting bracket |
| 82 | longer arm of 78/80 |
| 83 | shorter arm of 78/80 |
| 84 | locking latch |
| 85 | pivot attachment of locking latch at 83 |
| 86 | notch |
| 88 | opening with retainer ledge at 14, 16 |
| 90 | biasing actuator |
| 91 | upper pivoted end of 90 |
| 92 | lower pivoted end of 90 at 84 or 83 |
| 94 | guide pin/follower cam of locking latch 84 |
| 95 | guide pin/follower cam of 83 where no latch 84 present |
| 96 | water ballast tank |
| 97 | tank base block |
| 98 | tank wall |
| 99 | tank cavity |
| 100 | baffle plate for 98 of 96 |
| 102 | tank water supply pipe |
| 104 | tank water riser pipe/weir |
| 105 | head space in tank 96 |
| 106 | water discharge channels/bores in 97 |
| 108 | cam-valved drainage arrangement |
| 110 | cylindrical valve body |
| 111 | knob of 110 |
| 112 | rear cam plate of 110 |
| 114 | bore in base block for riser pipe/tube |
| 115 | push rod |
| 116 | plug |
| 118 | drainage holes in riser pipe/tube |
| 120 | mains water inlet coupling |
| 122 | drainage water outlet coupling |
| 124 | by-pass water coupling |
| 126 | hoses |
| 130 | Locking latch member |
| 131 | upper terminal end |
| 132 | lower terminal end |
| 133 | guiding slot |
| 134 | follower roller (axis) at 132 |
| 140 | retainer |
| 141 | cover plate 141 |
| 142 | two fastening and guide bolts |
| 144 | frame section (of 12) |
| 146 | release lever |
| 147 | operable free end of 146 |
| 148 | articulated angled free end of 146 |
| 149 | slot in 148 |
| 150 | axle of 146 secured in 144 |
| 152 | coupling and follower bolt at 130 |
| 154 | cam (formed at leg 83 of bracket 78) |
| 156 | cam guide surface |
| 158 | stepped recess in 154 at end of 156 |
| 159 | hump in 156 |

The invention claimed is:

1. A portable water dispensing station, including:

a housing;

housing-internal water supply pipework plumbed to supply water from an externally accessible water inlet coupling at the housing to one or more water dispensing outlets arranged at different points about the housing;

two coaxially spaced apart transport wheels mounted near a bottom face of the housing to protrude from the bottom face such that the housing can be wheeled towards/away from a stand surface on which the water dispensing station is to be deployed in use; and a base for supporting the housing on the stand surface, the base comprising two base flaps, each of the two base flaps being permanently hinged about a respective hinge axis, the two base flaps being on opposite sides of the housing for deployment between a stored position in which the two base flaps extend about parallel to the respective housing sides and a self-arrestable fully deployed position in which the two base flaps extend perpendicular to the respective housing sides and abut the stand surface.

2. The water dispensing station of claim 1, wherein the housing is of rectangular columnar configuration, with a housing width dimension of two to four times a housing depth dimension and a housing height dimension three to five or more times the housing width dimension, the two base flaps each hinged near or at a bottom of respective front and rear width-ward side faces of the housing.

3. The water dispensing station of claim 1, wherein the housing has a housing width, wherein the two base flaps each have a base flap width about the same as the-housing width, and wherein the base flaps each comprise a rectangular plate secured between or integral with two mounting profiles which in turn are pivotally secured to respective opposite width-ward sides of the housing.

4. The water dispensing station of claim 1, wherein one or both of the two base flaps is/are shaped and/or hinged near a bottom of the housing in such manner that when being moved into and reaching the fully deployed position(s), the transport wheels are lifted by a predetermined small distance from the stand surface.

5. The water dispensing station of claim 1, further including for each of the two base flaps a self-engaging arresting mechanism devised to lock and positionally fix the respective one of the two base flaps as the respective base flap is moved into and upon reaching the fully deployed position.

6. The water dispensing station of claim 5, wherein each arresting mechanism comprises a locking cam arranged to rotate with a respective one of the two base flaps about the hinge axis of the respective base flap, and a locking latch member cooperating with the locking cam, the locking latch member secured to the housing for to and fro or rotational movement such that a terminal end of the locking latch member is disposed to ride a guide surface of the locking cam in crank-like manner during rotation of the respective base flap between the stored and fully deployed positions.

7. The water dispensing station of claim 6, wherein, for each arresting mechanism, a stepped locking depression is present at one end of the guide surface, and the terminal end of the locking latch member self-locates into the stepped locking depression in pawl-like manner when the respective base flap is in the fully deployed position.

8. The water dispensing station of claim 6, further including, for each arresting mechanism, a biasing arrangement acting on the locking latch member to positively bias the terminal end of the locking latch member onto the locking cam's guide surface and/or in a stepped locking depression of the locking cam.

9. The water dispensing station of claim 6, wherein, for each arresting mechanism, the guide surface of the locking cam is contoured to include a small hump or shallow recess over which the terminal end of the locking latch member rides immediately before the respective base flap reaches the stored position when the respective base flap is rotated from the deployed into the stored position.

10. The water dispensing station of claim 6, wherein each arresting mechanism further includes a release lever pivoted at the housing and articulated to the locking latch member in such manner that selective manual pivoting of the release lever moves the terminal end of the locking latch member out of engagement with a stepped locking depression of the locking cam.

11. The water dispensing station of claim 5, wherein each arresting mechanism comprises a pivotable locking latch member movable with the respective one of the two base flaps and positioned to self-engage with a retainer at the housing when the respective base flap reaches or is in the fully deployed position.

12. The water dispensing station claim 11, wherein each arresting mechanism further comprises a manually operable latch release lever positioned for access on a side of the housing and disposed to move the respective locking latch member out of engagement with the respective retainer.

13. The water dispensing station of claim 11, wherein the two base flaps each comprise a rectangular plate secured between or integral with two mounting profiles which in turn are pivotally secured to respective opposite width-ward sides of the housing, wherein the two mounting profiles are generally L-shaped brackets, and wherein one said locking latch member per each of the two base flaps is articulated/pivoted near a terminal end of a shorter leg of one of the L-shaped brackets.

14. The water dispensing station of claim 13, wherein each locking latch member includes a sideways protruding guiding pin which is received within a curved slot at the housing for guidance of the locking latch member during rotation of the respective one of the two base flaps between the stored and fully deployed positions of the respective base flap and ensuring the locking latch member is correctly orientated and directed to engage with the cooperating retainer at the housing.

15. The water dispensing station of claim 11, further including a biasing arrangement devised to positively bias the locking latch members to remain in a deployed, flap-movement arresting position, and wherein the biasing arrangement comprises one or more of a torsion spring element, a pressure gas spring, and a gas filled cylinder-piston actuator.

16. The water dispensing station of claim 1, wherein the hinge axis of one of the two base flaps is collinear with an axis of rotation of the transport wheels.

17. The water dispensing station of claim 16, wherein the axis of rotation is located near a front or back side lower edge of the housing such that the housing can be tipped over in controlled manner when the respective base flap is in the stored position for moving the water dispensing station like a two-wheeled transport trolley from/to a deployment location, wherein a distance of a lowermost ground-engaging surface of the respective base flap to the axis of rotation is larger than a radius of the transport wheels, and wherein the respective base flap has a ground-engaging part shaped with a rounded contour to facilitate full rotation of the base flap into the fully deployed position causing lifting of the transport wheels off the stand surface.

18. The water dispensing station of claim 1, further including one or more of:

housing-internal water drainage pipework plumbed to drain water spilled from the one or more water dispensing outlets towards an externally accessible water drainage coupling at the housing;

a tray articulated to a side of the housing in such manner that the tray is deployable between an arrestable folded position about flush with a front or rear side of the housing and an arrested but releasable deployed position in which the tray extends about perpendicular from the housing side, wherein one of the one or more water dispensing outlets is a bubbler or fountain-type water dispensing outlet incorporated or present at the tray;

a container filling outlet provided by at least one of the water dispensing outlets and located above a container support surface at the housing adapted to support a drinking container in upright standing position; and a water ballast tank received within the housing, positioned at a lower end of the housing.

19. The water dispensing station of claim 1, further including a water ballast tank received within the housing, positioned at a lower end of the housing, wherein the water ballast tank has one or more of (i) a dedicated filling and/or drainage spout with shut-off valve, (ii) a valved tank water supply line or pipe plumbed to the housing-internal water supply pipework for filling the water ballast tank with mains water via the water inlet coupling, and (iii) a tank water supply line or pipe plumbed to housing-internal water drainage pipework for filling the water ballast tank using water supplied from the one or more water dispensing outlets.

20. The water dispensing station of claim 1, further including:

housing-internal water drainage pipework plumbed to drain water spilled from the one or more water dispensing outlets towards an externally accessible water drainage coupling at the housing; and a water ballast tank received within the housing, positioned at a lower end of the housing;

wherein the water ballast tank is fully incorporated hydraulically into the housing-internal water drainage pipework whereby spill water drainage from the water dispensing station is accomplished via directing spill water first into the water ballast tank and then from the water ballast tank to waste, and including a tank overflow prevention mechanism.

21. The water dispensing station of claim 20, wherein the tank overflow prevention mechanism comprises a weir within the water ballast tank from where spill water above a certain fill-degree of the water ballast tank is removed by draining tank water into a tank-internal riser pipe plumbed to the water drainage coupling, and wherein a drainage hose is connected to the water drainage coupling for draining spillage water to a location remote from the water dispensing station, and further comprising a cam-valved drainage access near or at a lowest fill level of the water ballast tank in the riser pipe for draining the water ballast tank via the water drainage coupling.

* * * * *